United States Patent
Oohashi et al.

(10) Patent No.: US 6,501,204 B1
(45) Date of Patent: Dec. 31, 2002

(54) STATOR FOR AN ALTERNATOR

(75) Inventors: Atsushi Oohashi, Tokyo (JP); Katsumi Adachi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 75 days.

(21) Appl. No.: 09/680,261

(22) Filed: Oct. 5, 2000

(30) Foreign Application Priority Data

Dec. 24, 1999 (JP) .......................................... 11-367534

(51) Int. Cl.[7] .................................................. H02K 1/00
(52) U.S. Cl. ............................ 310/179; 310/18; 29/596
(58) Field of Search ................................ 310/179, 180; 29/596

(56) References Cited

U.S. PATENT DOCUMENTS

| | | | |
|---|---|---|---|
| 3,453,468 A | 7/1969 | Lund ........................... | 310/206 |
| 4,594,523 A | 6/1986 | Horita et al. .................. | 310/42 |
| 4,833,356 A | 5/1989 | Bansal et al. ................ | 310/207 |
| 5,122,705 A * | 6/1992 | Kusase et al. ............. | 310/180 |
| 5,231,324 A | 7/1993 | Kawamura et al. ......... | 310/198 |
| 5,536,987 A * | 7/1996 | Hayashi et al. ............. | 310/181 |
| 5,654,602 A * | 8/1997 | Willyoung .................. | 310/179 |
| 5,898,251 A * | 4/1999 | Moshizuki et al. ........... | 29/596 |
| 5,955,810 A | 9/1999 | Umeda et al. | |
| 5,982,068 A | 11/1999 | Umeda et al. .............. | 310/206 |
| 5,998,903 A * | 12/1999 | Umeda et al. .............. | 310/179 |
| 6,137,201 A * | 10/2000 | Umeda et al. .............. | 310/179 |
| 6,140,735 A * | 10/2000 | Kato et al. ................... | 310/201 |
| 6,166,471 A | 12/2000 | Kometani et al. | |
| 6,198,190 B1 * | 3/2001 | Umeda et al. .............. | 310/179 |
| 6,201,332 B1 * | 3/2001 | Umeda et al. .............. | 310/179 |

FOREIGN PATENT DOCUMENTS

| | | | |
|---|---|---|---|
| DE | 19652796 | 6/1998 | |
| DE | A-199-22-794 | 11/1999 | |
| EP | 0881752 A | 12/1998 | |
| EP | 0881752 | 12/1998 | |
| JP | 127167 | 11/1938 | |
| JP | 47-29361 | 9/1972 | .......... H02K/55/01 |
| JP | 58 116031 A | 7/1983 | |
| JP | 58-116031 | 7/1983 | |
| JP | 61 221559 | 10/1986 | |
| JP | H-4-26345 | 1/1992 | |
| JP | 5-95644 | 4/1993 | ............ H02K/3/04 |
| JP | 07163074 | 6/1995 | |
| JP | 10-14149 | 1/1998 | ............ H02K/3/28 |
| JP | 11-98788 | 4/1999 | .......... H02K/19/22 |
| JP | 11-155270 | 6/1999 | |
| JP | 11-164500 | 6/1999 | ............ H02K/1/16 |
| JP | 11-164505 | 6/1999 | ............ H02K/3/24 |
| JP | 11-164506 | 6/1999 | ............ H02K/3/50 |
| WO | WO 92 06527 | 4/1992 | |

* cited by examiner

Primary Examiner—Joseph Waks
(74) Attorney, Agent, or Firm—Sughrue Mion, PLLC

(57) ABSTRACT

A stator for an alternator includes a cylindrical stator core composed of a laminated core formed with a number of slots extending axially at a predetermined pitch in a circumferential direction, and a polyphase stator winding including a number of winding sub-portions in each of which a long strand of wire is wound so as to alternately occupy an inner layer and an outer layer in a slot depth direction within the slots at intervals of a predetermined number of slots, the strand of wire folding back outside the slots at axial end surfaces of the stator core, wherein the winding sub-portions are constituted by at least one winding assembly composed of a pair of first and second winding groups, the first winding group including a number of first winding sub-portions each having one turn constructed by winding one of the strands of wire so as to alternately occupy an inner layer and an outer layer in a slot depth direction within the slots at intervals of the predetermined number of slots, the first winding sub-portions being disposed at a pitch of one slot from each other and being equal in number to the predetermined number of slots, and the second winding group including a number of second winding sub-portions each having one turn constructed by winding one of the strands of wire so as to alternately occupy an inner layer and an outer layer in a slot depth direction within the slots at intervals of the predetermined number of slots and so as to be inversely wound and offset by an electrical angle of 180° relative to the first winding sub-portions, the second winding sub-portions being disposed at a pitch of one slot from each other and being equal in number to the predetermined number of slots.

9 Claims, 23 Drawing Sheets

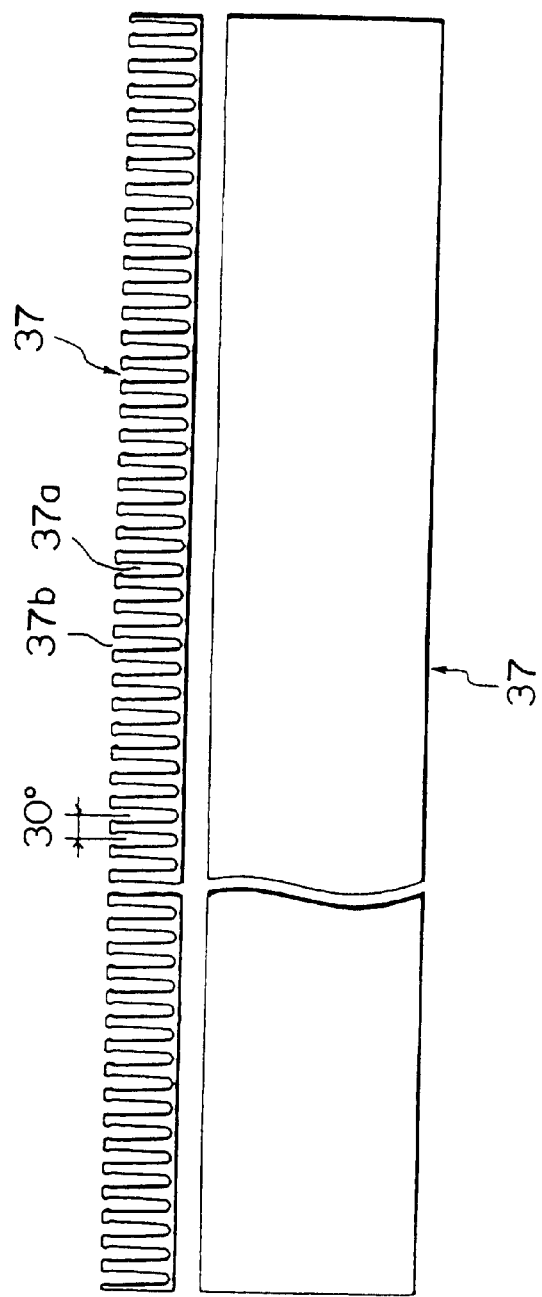

STATOR FOR AN ALTERNATOR

BACKGROUND OF THE INVENTION

1. Field of the Invention

The present invention relates to a stator of an alternator driven by an internal combustion engine, for example, and in particular, relates to a stator construction for an automotive alternator mounted to an automotive vehicle such as a passenger car or a truck.

2. Description of the Related Art

FIG. 25 is a side elevation showing part of a stator of a conventional automotive alternator such as described in Japanese Patent No. 2927288, for example. FIG. 26 is a perspective showing a conductor segment used in the stator of the conventional automotive alternator shown in FIG. 25, and FIGS. 27 and 28 are perspectives from a front end and a rear end, respectively, of part of the stator of the conventional automotive alternator shown in FIG. 25.

In FIGS. 25 to 28, the stator 50 includes: a stator core 51; a stator winding 52 wound onto the stator core 51; and insulators 53 mounted inside slots 51a, the insulators 53 insulating the stator winding 52 from the stator core 51. The stator core 51 is a cylindrical laminated core laminated by stacking thin steel plates, and has a number of slots 51a extending axially disposed at even pitch circumferentially so as to be open on an inner circumferential side. In this case, ninety-six slots 51a are formed so as to house two three-phase winding portions such that the number of slots housing each phase of winding portion corresponds to the number of magnetic poles (sixteen) in a rotor (not shown). The stator winding 52 is constructed by joining a number of short conductor segments 54 in a predetermined winding pattern.

The conductor segments 54 are formed into a general U shape from an insulated copper wire material having a rectangular cross section, and are inserted two at a time from an axial rear end into pairs of slots 51a six slots apart (a pitch of one magnetic pole). Then, end portions of the conductor segments 54 extending outwards at a front end are joined to each other to constitute the stator winding 52.

More specifically, in pairs of slots 15a six slots apart, first conductor segments 54 are inserted from the rear end into first positions from an outer circumferential side within first slots 51a and into second positions from the outer circumferential side within second slots 51a, and second conductor segments 54 are inserted from the rear end into third positions from the outer circumferential side within the first slots 51a and into fourth positions from the outer circumferential side within the second slots 51a. Thus, within each slot 15a, four straight portions 54a of the conductor segments 54 are arranged to line up in a row in a radial direction.

Then, end portions 54b of the conductor segments 54 extending outwards at the front end from the first positions from the outer circumferential side within the first slots 51a and end portions 54b of the conductor segments 54 extending outwards at the front end from the second positions from the outer circumferential side within the second slots 51a six slots away in a clockwise direction from the first slots 51a are joined to form an outer layer winding having two turns. In addition, end portions 54b of the conductor segments 54 extending outwards at the front end from the third positions from the outer circumferential side within the first slots 51a and end portions 54b of the conductor segments 54 extending outwards at the front end from the fourth positions from the outer circumferential side within the second slots 51a six slots away in a clockwise direction from the first slots 51a are joined to form an inner layer winding having two turns.

In addition, the inner-layer winding and outer-layer winding constituted by the conductor segments 54 inserted into the pairs of slots 51a six slots apart are connected in series to form one winding phase portion having four turns.

A total of six winding phase portions each having four turns are formed in this manner such that the slots into which the conductor segments 54 of each winding phase portion are inserted are offset by one slot each. The stator winding 52 composed of two three-phase stator winding portions is constructed by connecting the winding phase portions three apiece into alternating-current connections.

In the conventional stator 50 constructed in this manner, at the rear end of the stator core 51, turn portions 54c of the pairs of conductor segments 54 inserted into the same pairs of slots 15a are lined up in rows in a radial direction. As a result, the turn portions 54c are arranged in two rows circumferentially to constitute a rear-end coil end group.

At the front end of the stator core 51, on the other hand, joint portions formed by joining the end portions 54b of the conductor segments 54 extending outwards at the front end from the first positions from the outer circumferential side within the first slots 51a and the end portions 54b of the conductor segments 54 extending outwards at the front end from the second positions from the outer circumferential side within the second slots 51a six slots away, and joint portions formed by joining the end portions 54b of the conductor segments 54 extending outwards at the front end from the third positions from the outer circumferential side within the first slots 51a and the end portions 54b of the conductor segments 54 extending outwards at the front end from the fourth positions from the outer circumferential side within the second slots 51a six slots away are arranged to line up radially. As a result, joint portions formed by joining end portions 54b to each other are arranged in two rows circumferentially to constitute a front-end coil end group.

In the stator 50 of the conventional automotive alternator, as explained above, the stator winding 52 is constructed by inserting short conductor segments 54 formed in the general U shape into the slots 51a of the stator core 51 from the rear end, and joining end portions 54b of the conductor segments 54 extending outwards at the front end.

Thus, because the front-end coil end group is constructed by circumferentially arranging the joint portions formed by joining the end portions 54b, which have lost their insulation due to soldering or welding, the coil-end construction is easily corroded by exposure to moisture, making corrosion resistance extremely low.

Furthermore, because the front-end coil end group is composed of two rows of ninety-six joint portions, i.e., 192 joint portions, the construction facilitates short-circuiting between the joint portions, increasing the likelihood of short-circuiting accidents.

A large number of the short conductor segments 54 must be inserted into the stator core 51 and their end portions 54b must be joined by welding, soldering, etc., significantly reducing operability. Furthermore, the amount of each conductor segment 54 which is inserted into the slots 51a must be greater than the length of the stator core 51, facilitating damage to the insulation and reducing the quality of the finished product. In addition, when joining the end portions 54b, short-circuiting often occurs between the joint portions due to spilt solder or weld melt, significantly decreasing mass-producibility.

In the conventional stator 50, the end portions 54b of the conductor segments 54 are joined to each other by clamping a portion thereof in a jig, and soldering or welding the tips thereof. Thus, because clamping area is required for the jig and expansion of the soldered portions or welded portions occurs, the height of the coil ends is increased and space between the joint portions is reduced. Furthermore, when the end portions 54b of the conductor segments 54 are welded, the conductor segments 54 are softened by temperature increases during welding, leading to decreases in the rigidity of the stator. As a result, when the conventional stator 50 is mounted to an automotive alternator, coil leakage reactance in the coil end portions is increased, causing output to deteriorate, wind resistance is increased, exacerbating wind noise, and rigidity of the stator is reduced, decreasing the effective reduction in magnetic noise.

SUMMARY OF THE INVENTION

The present invention aims to solve the above problems and an object of the present invention is to provide a stator for an alternator increasing corrosion resistance and insulation properties by significantly reducing the number of joints in the coil ends using winding assemblies composed of an arrangement of a number of winding sub-portions each having one turn composed of continuous wire, and improving assembly and productivity by improving the installation of the windings into the stator core.

In order to achieve the above object, according to one aspect of the present invention, there is provided a stator for an alternator, including:

a cylindrical stator core composed of a laminated core formed with a number of slots extending axially at a predetermined pitch in a circumferential direction; and a polyphase stator winding including a number of winding sub-portions in each of which a long strand of wire is wound so as to alternately occupy an inner layer and an outer layer in a slot depth direction within the slots at intervals of a predetermined number of slots, the strand of wire folding back outside the slots at axial end surfaces of the stator core, wherein the winding sub-portions are constituted by at least one winding assembly composed of a pair of first and second winding groups, the first winding group including a number of first winding sub-portions each having one turn constructed by winding one of the strands of wire so as to alternately occupy an inner layer and an outer layer in a slot depth direction within the slots at intervals of the predetermined number of slots, the first winding sub-portions being disposed at a pitch of one slot from each other and being equal in number to the predetermined number of slots, and the second winding group including a number of second winding sub-portions each having one turn constructed by winding one of the strands of wire so as to alternately occupy an inner layer and an outer layer in a slot depth direction within the slots at intervals of the predetermined number of slots and so as to be inversely wound and offset by an electrical angle of 180° relative to the first winding sub-portions, the second winding sub-portions being disposed at a pitch of one slot from each other and being equal in number to the predetermined number of slots.

BRIEF DESCRIPTION OF THE DRAWINGS

FIGS. 10A and 10B are a side elevation and a rear elevation, respectively, explaining the construction of a stator core used in the automotive alternator;

DETAILED DESCRIPTION OF THE PREFERRED EMBODIMENTS

The preferred embodiments of the present invention will now be explained with reference to the drawings.

Embodiment 1

Figure 1:
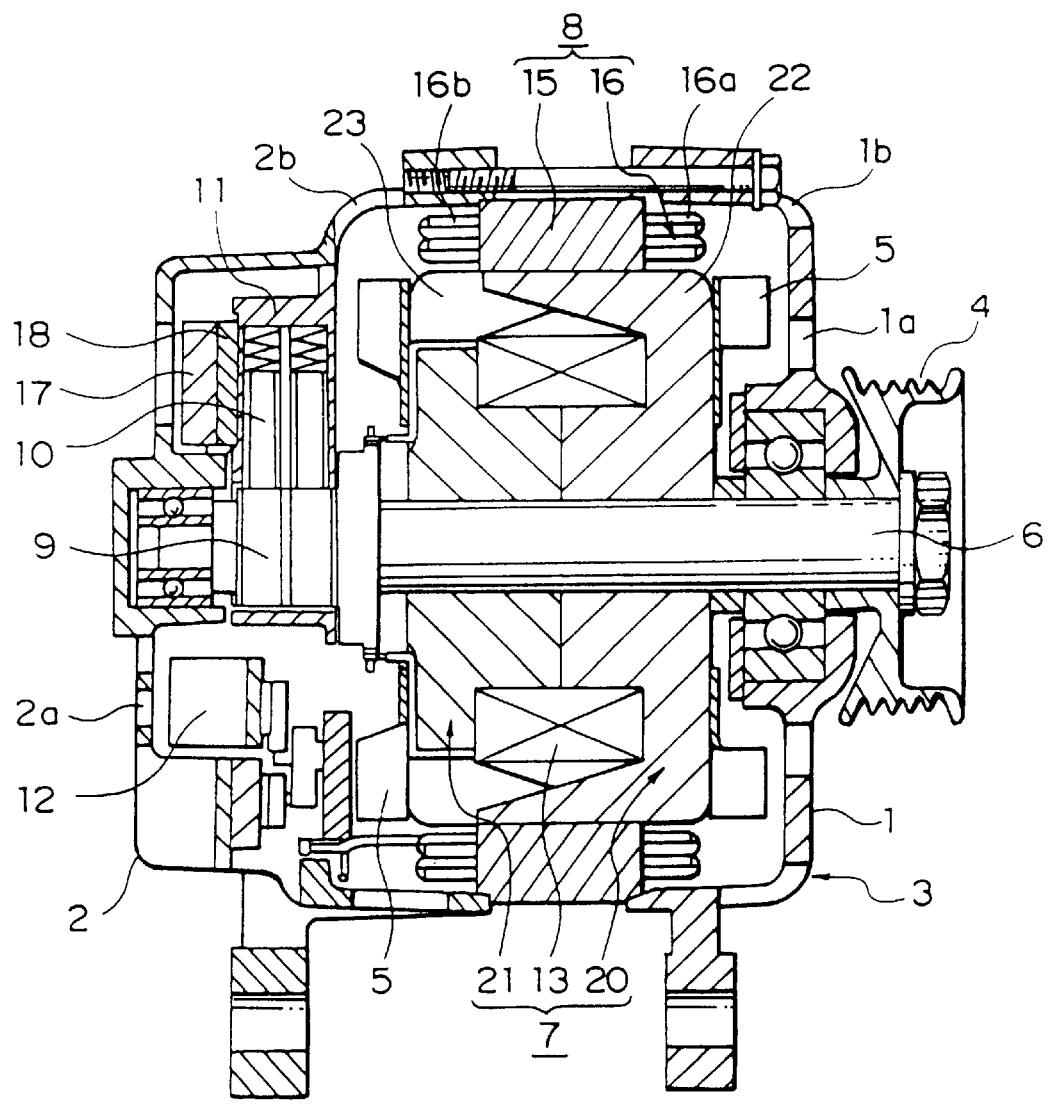
FIG. 1 is a cross section showing a construction of an automotive alternator according to Embodiment 1 of the present invention.
Figure 2:
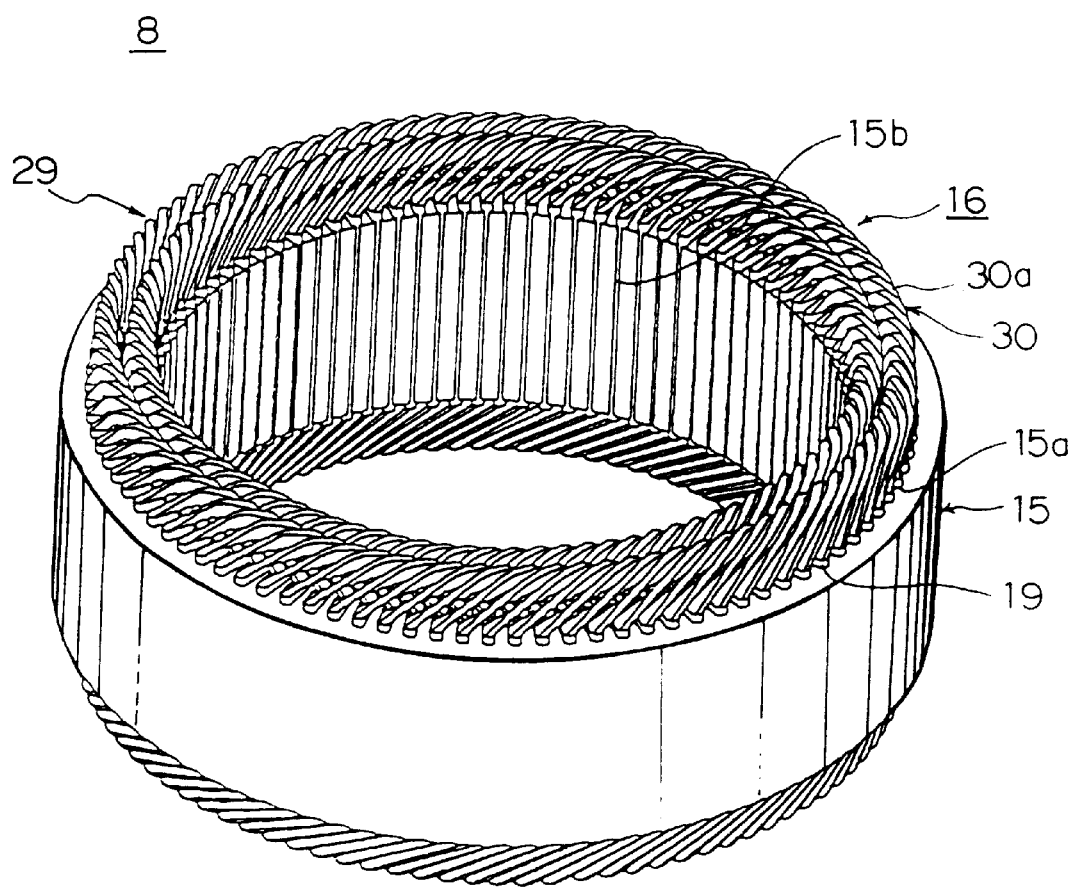
FIG. 2 is a perspective showing a stator of the automotive alternator according to Embodiment 1 of the present invention.
Figure 3:
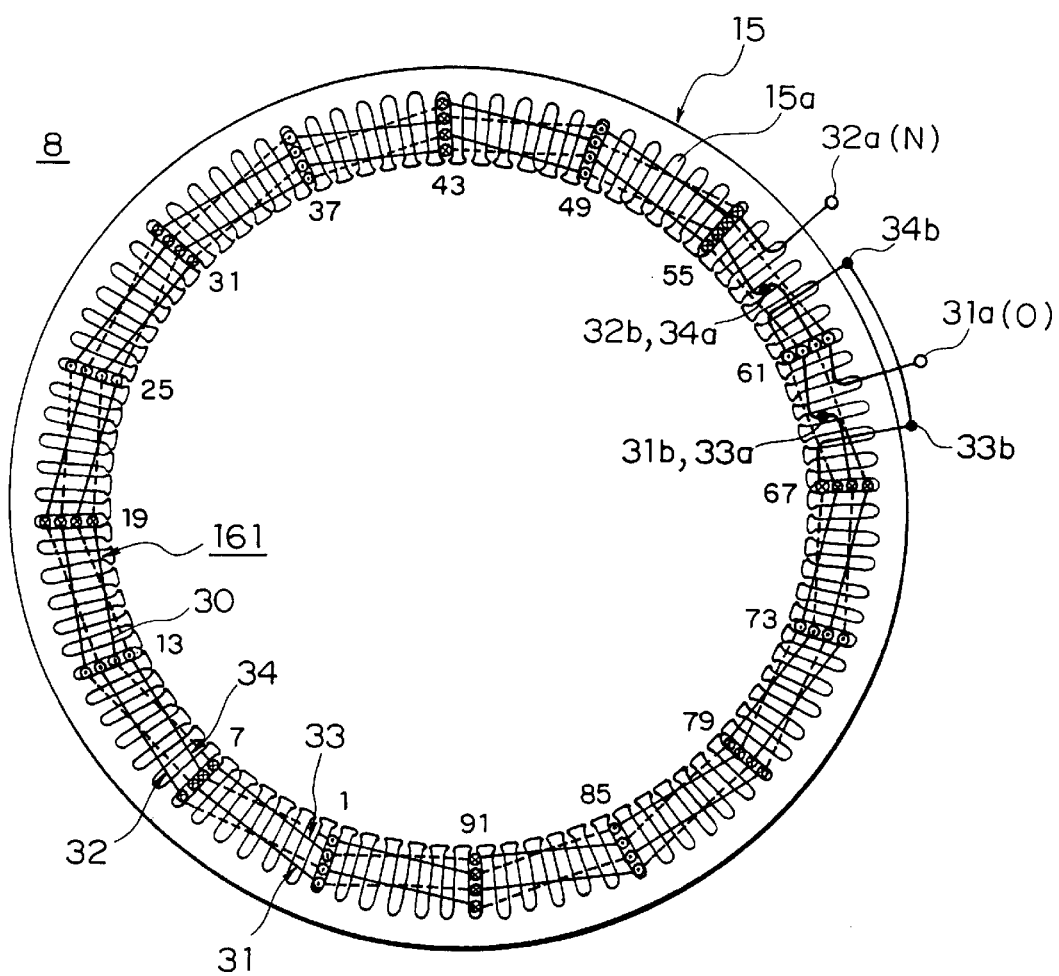
FIG. 3 is an end elevation explaining connections in one stator winding phase portion in the automotive alternator according to Embodiment 1 of the present invention.
Figure 4:
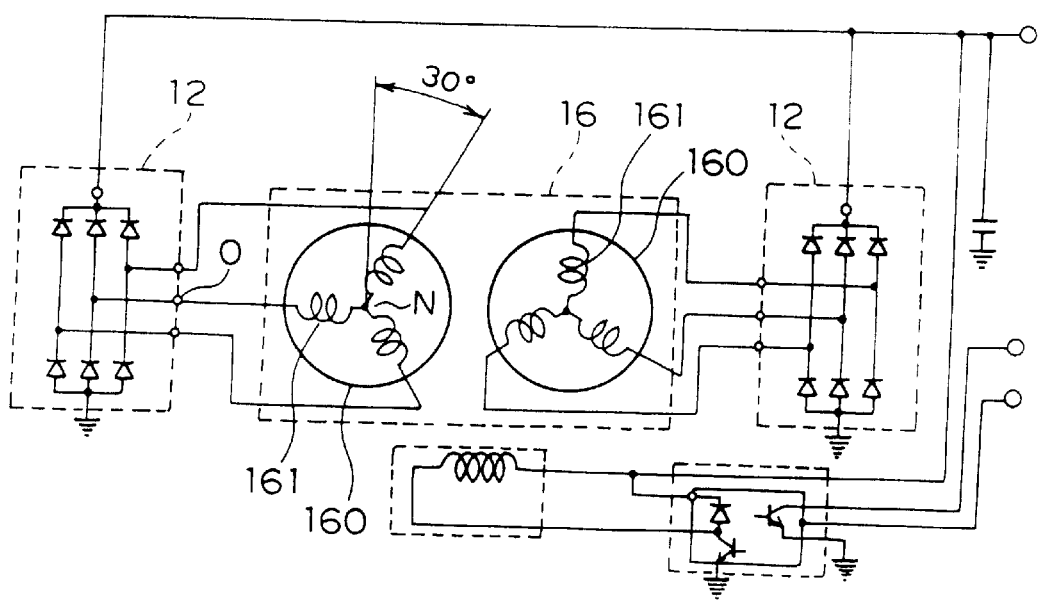
FIG. 4 is a circuit diagram for the automotive alternator according to Embodiment 1 of the present invention.
Figure 5:
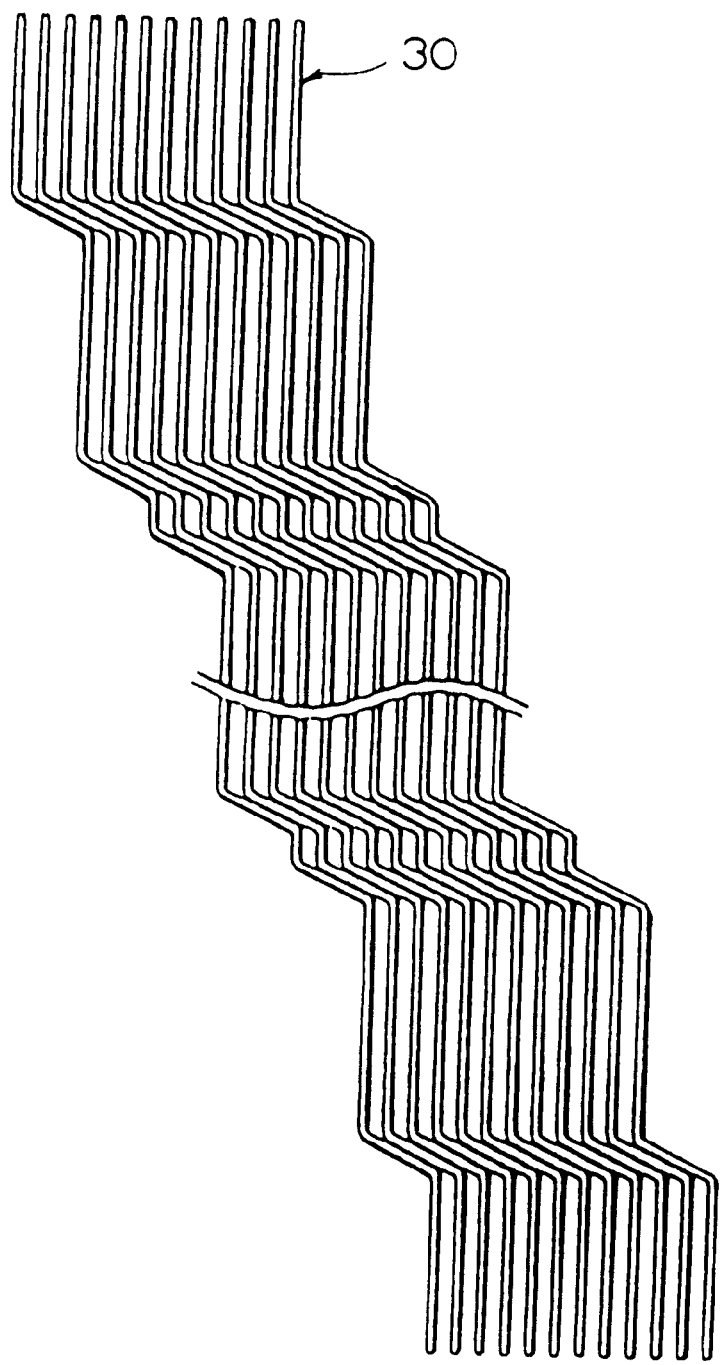
FIG. 5 is a diagram explaining the manufacturing process for a winding assembly constituting part of the stator winding used in the automotive alternator according to Embodiment 1 of the present invention.
Figure 6:
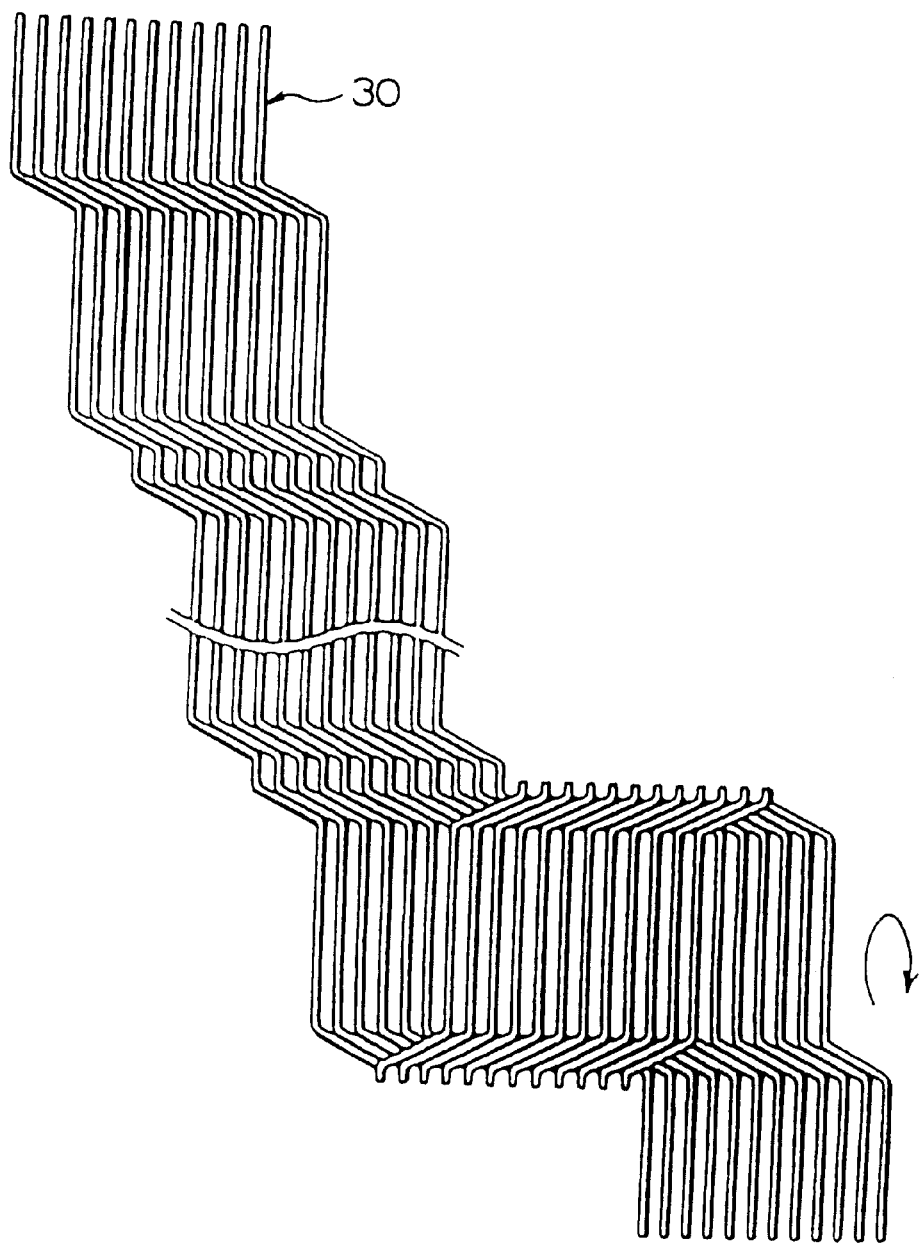
FIG. 6 is a diagram explaining the manufacturing process for a winding assembly constituting part of the stator winding used in the automotive alternator according to Embodiment 1 of the present invention.
Figures 7A, 7B:
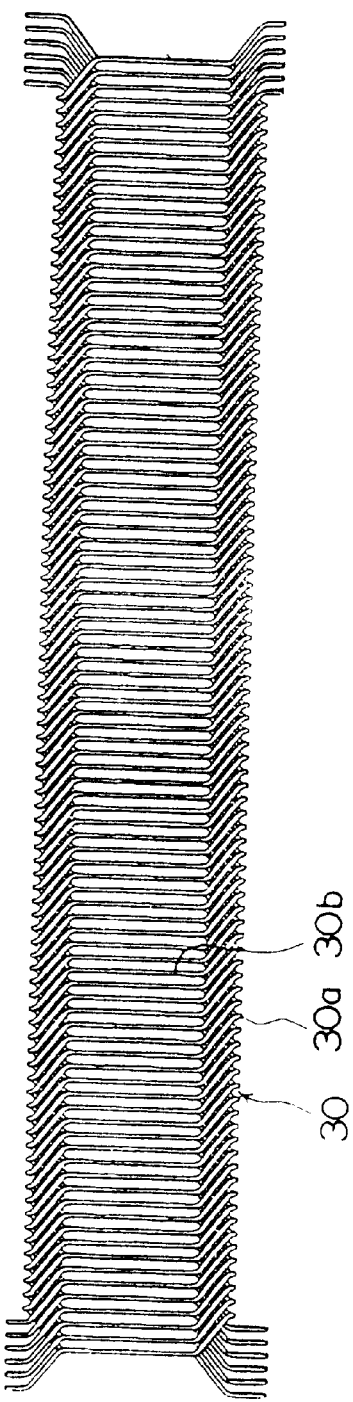
FIGS. 7A and 7B are an end elevation and a plan, respectively, showing a winding assembly constituting part of the stator winding used in the automotive alternator according to Embodiment 1 of the present invention.
Figure 8:
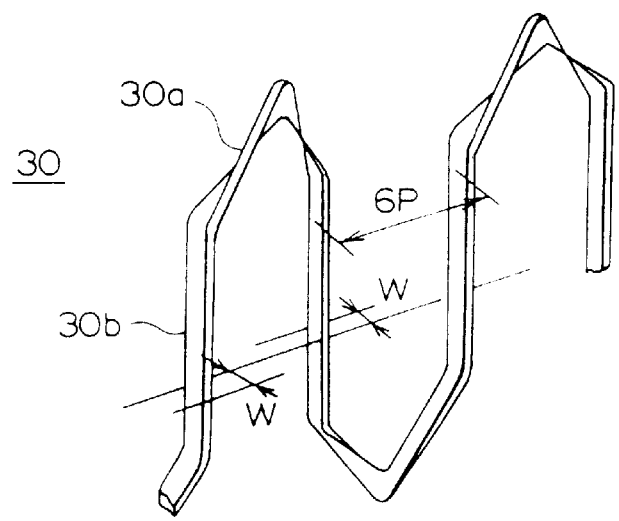
FIG. 8 is a perspective showing part of a strand of wire constituting part of the stator winding used in the automotive alternator according to Embodiment 1 of the present invention.
Figure 9:
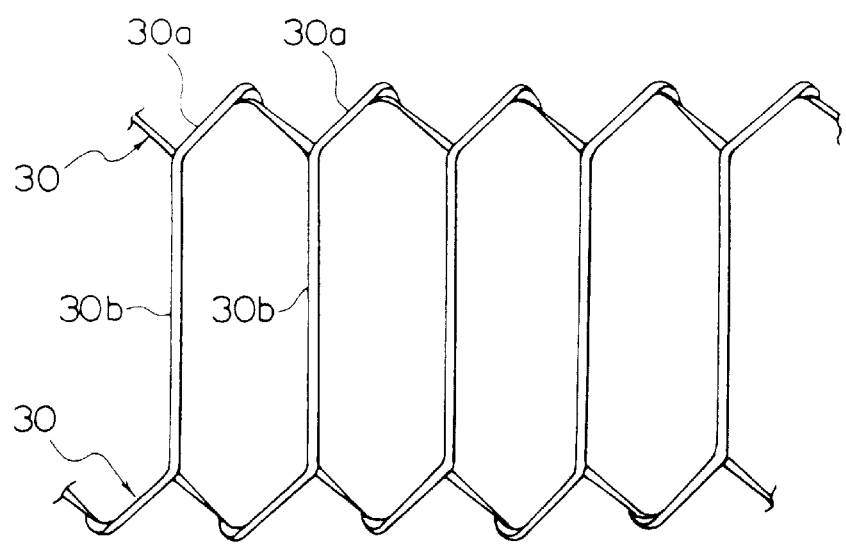
FIG. 9 is a diagram explaining the arrangement of strands of wire constituting part of the stator winding used in the automotive alternator according to Embodiment 1 of the present invention.
Figure 11A:
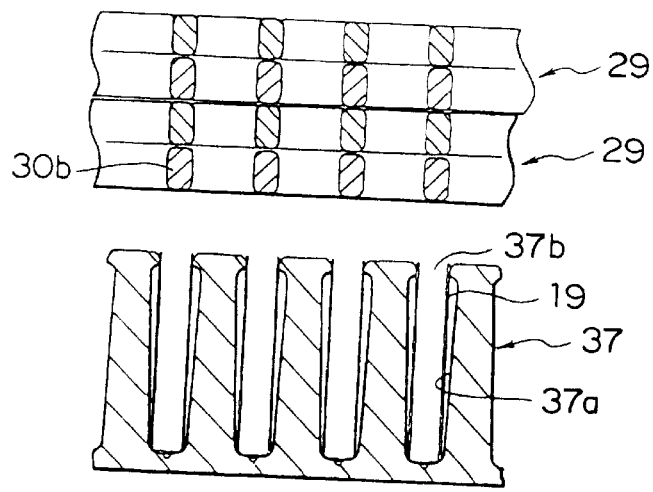
FIGS. 11A, 11B, and 11C are cross sections explaining the manufacturing process for the stator used in this automotive alternator.
Figure 11B:
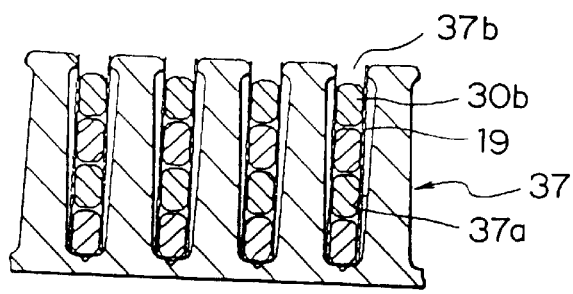
Figure 11C:
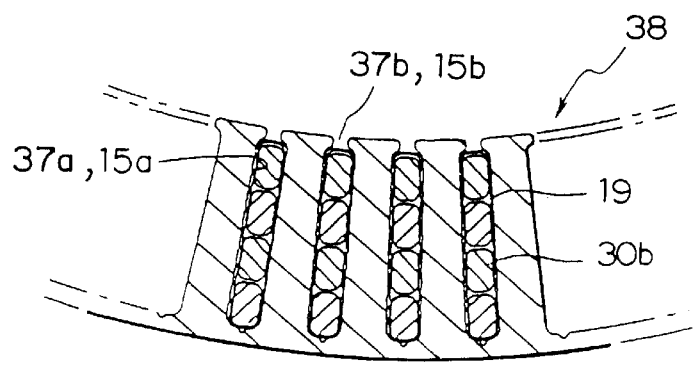
Figure 12:
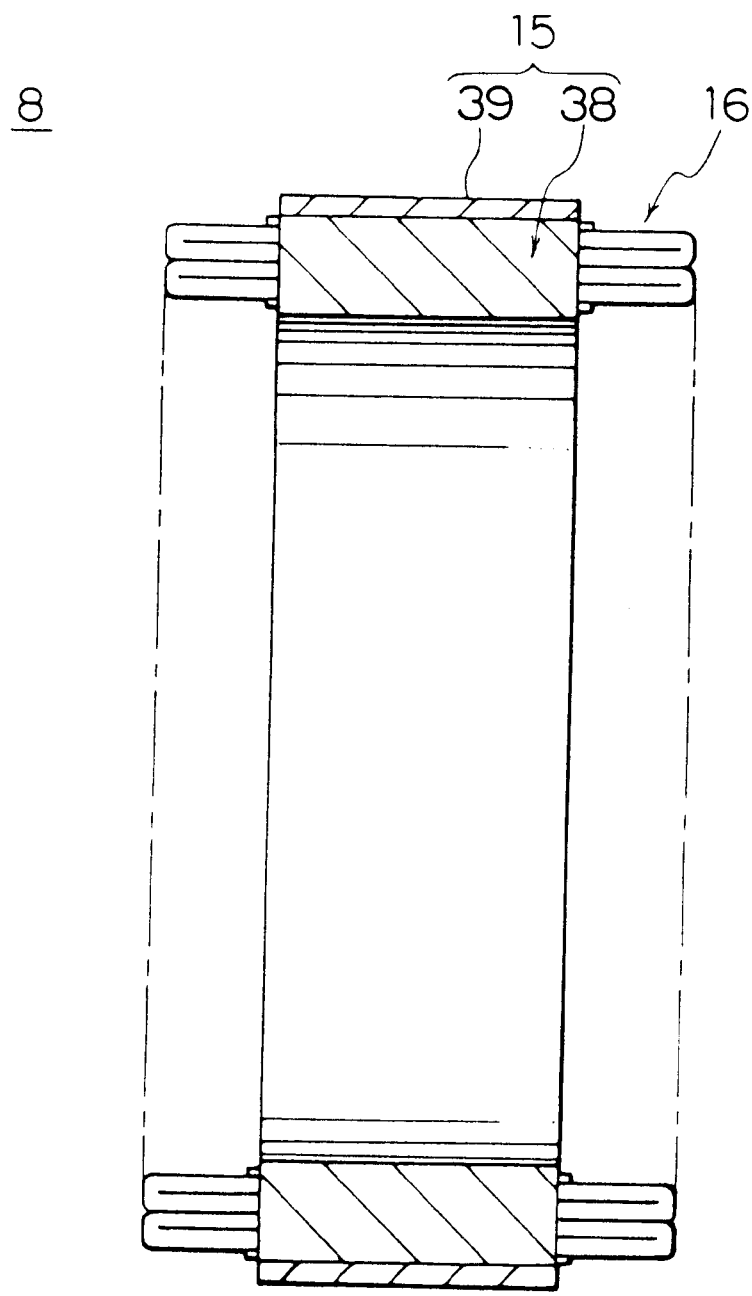
FIG. 12 is a cross section explaining the manufacturing process for the stator used in the automotive alternator according to Embodiment 1 of the present invention.

FIG. 1 is a cross section showing a construction of an automotive alternator according to Embodiment 1 of the present invention, FIG. 2 is a perspective showing a stator of this automotive alternator, FIG. 3 is an end elevation explaining connections in one stator winding phase portion in this automotive alternator, FIG. 4 is a circuit diagram for this automotive alternator, FIGS. 5 and 6 are diagrams explaining the manufacturing process for a winding assembly constituting part of the stator winding used in this automotive alternator, FIGS. 7A and 7B are an end elevation and a plan, respectively, showing a winding assembly constituting part of the stator winding used in this automotive alternator. FIG. 8 is a perspective showing part of a strand of wire constituting part of the stator winding used in this automotive alternator, and FIG. 9 is a diagram explaining the arrangement of strands of wire constituting part of the stator winding used in this automotive alternator. FIGS. 10A and 10B are a side elevation and a rear elevation, respectively, explaining the construction of a stator core used in this automotive alternator, FIGS. 11A, 11B, and 11C are cross sections explaining the manufacturing process for the stator used in this automotive alternator, and FIG. 12 is a cross section explaining the manufacturing process for the stator used in this automotive alternator. Moreover, an output wire and a crossover connection have been omitted from FIG. 2.

In FIG. 1, the automotive alternator is constructed by rotatably mounting a Lundell-type rotor 7 inside a case 3 constructed from an aluminum front bracket 1 and an aluminum rear bracket 2 by means of a shaft 6, and fastening a stator 8 to an inner wall of the case 3 so as to cover an outer circumferential side of the rotor 7.

The shaft 6 is rotatably supported in the front bracket 1 and the rear bracket 2. A pulley 4 is fastened to a first end of this shaft 6 so that rotational torque from an engine can be transmitted to the shaft 6 by means of a belt (not shown).

Slip rings 9 for supplying electric current to the rotor 7 are fastened to a second end of the shaft 6, and a pair of brushes 10 are housed in a brush holder 11 disposed inside the case 3 such that the pair of brushes 10 slide in contact with the slip rings 9. A regulator 18 for adjusting the magnitude of alternating voltage generated in the stator 8 is fastened by adhesive to a heat sink 17 fitted onto the brush holder 11. Rectifiers 12 which are electrically connected to the stator 8 and convert alternating current generated in the stator 8 into direct current are mounted inside the case 3.

The rotor 7 includes a rotor coil 13 for generating magnetic flux on passage of electric current, and a pair of pole cores 20 and 21 disposed so as to cover the rotor coil 13, magnetic poles being formed in the pole cores 20 and 21 by magnetic flux generated in the rotor coil 13. The pair of pole cores 20 and 21 are made of iron, each has eight claw-shaped magnetic poles 22 and 23 disposed on an outer circumferential perimeter at even pitch in a circumferential direction so as to project axially, and the pole cores 20 and 21 are fastened to the shaft 6 facing each other such that the claw-shaped magnetic poles 22 and 23 intermesh. In addition, fans 5 are fastened to first and second axial ends of the rotor 7.

Air intake openings 1a and 2a are disposed in axial end surfaces of the front-bracket 1 and the rear bracket 2, and air discharge openings 1b and 2b are disposed in two outer circumferential shoulder portions of the front bracket 1 and the rear bracket 2, opposite the radial outside of the front-end and rear-end coil ends 16a and 16b of the stator winding 16.

As shown in FIG. 2, the stator 8 includes: a cylindrical stator core 15 composed of a laminated core formed with a number of slots 16a extending axially at a predetermined pitch in a circumferential direction; a polyphase stator winding 16 wound onto the stator core 15; and insulators 19 installed in each of the slots 15a for electrically insulating the polyphase stator winding 16 from the stator core 15. The polyphase stator winding 16 includes two winding assemblies 29 disposed in two rows in a radial direction. The winding assemblies 29 are constituted by a number of winding sub-portions in each of which one strand of wire 30 is bent back outside the slots 15a at end surfaces of the stator core 15 and wound into a wave winding so as to alternately occupy an inner layer and an outer layer in a slot depth direction within slots 15a a predetermined number of slots apart. In this case, the stator core 15 is formed with ninety-six slots 15a at even pitch so as to house two three-phase stator winding portions 160, explained below, such that the number of slots housing each phase of the winding portions corresponds to the number of magnetic poles (sixteen) in the rotor 7. Long, insulated copper wire material having a rectangular cross section, for example, is used in the strands of wire 30.

Next, the winding construction of one stator winding phase portion 161 will be explained in detail with reference to FIG. 3.

One stator winding phase portion 161 is composed of first to fourth winding sub-portions 31 to 34 each formed from one strand of wire 30. The first winding sub-portion 31 is formed by wave winding one strand of wire 30 into every sixth slot from slot numbers 1 to 91 so as to alternately occupy a first position from an outer circumferential side and a second position from the outer circumferential side inside the slots 15a. The second winding sub-portion 32 is formed by wave winding a strand of wire 30 into every sixth slot from slot numbers 1 to 91 so as to alternately occupy the second position from the outer circumferential side and the first position from the outer circumferential side inside the slots 15a. The third winding sub-portion 33 is formed by wave winding a strand of wire 30 into every sixth slot from slot numbers 1 to 91 so as to alternately occupy a third position from the outer circumferential side and a fourth position from the outer circumferential side inside the slots 15a. The fourth winding sub-portion 32 is formed by wave winding a strand of wire 30 into every sixth slot from slot numbers 1 to 91 so as to alternately occupy the fourth position from the outer circumferential side and the third position from the outer circumferential side inside the slots 15a.

Thus, each of the first to fourth winding sub-portions 31 to 34 constitutes a winding sub-portion having one turn in which a single strand of wire 30 is wound into every sixth slot 15a so as to alternately occupy an inner layer and an outer layer in a slot depth direction. The strands of wire 30 are arranged to line up in a row of four strands in a radial direction within each slot 15a with the longitudinal direction of their rectangular cross sections aligned in a radial direction.

At a first end of the stator core 15, a second end portion 31b of the first winding sub-portion 31 extending outwards from the second position from the outer circumferential side of slot number 67 and a first end portion 33a of the third winding sub-portion 33 extending outwards from the third position from the outer circumferential side of slot number 61 are crossover-connected (adjacent-address crossover connection), a second end portion 33b of the second winding sub-portion 32 extending outwards from the second position from the outer circumferential side of slot number 61 and a first end portion 34a of the fourth winding sub-portion 34 extending outwards from the third position from the outer circumferential side of slot number 55 are crossover-connected (adjacent-address crossover connection), then a second end portion 33b of the third winding sub-portion 33 extending outwards from the fourth position from the outer circumferential side of slot number 67 and a second end portion 34b of fourth winding sub-portion 34 extending outwards from the fourth position from the outer circumferential side of slot number 61 are crossover-connected (same-address crossover connection). Thus, the first to the fourth winding sub-portions 31 to 34 are connected in series to form one stator winding phase portion 161 having four turns.

At this time, the first end portion 31a of the first winding sub-portion 31 extending outwards from the first position from the outer circumferential side of slot number 61 and the first end portion 32a of the second winding sub-portion 32 extending outwards from the first position from the outer circumferential side of slot number 55 become an output wire (O) and a neutral point (N), respectively, of the stator winding phase portion 161.

A total of six stator winding phase portions 161 are similarly formed by offsetting the slots 15a into which the strands of wire 30 are wound one slot at a time. Then, as shown in FIG. 4, three stator winding phase portions 161 are connected into each of two star connections to form the two three-phase stator winding portions 160, and each of the three-phase stator winding portions 160 is connected to its own rectifier 12. The rectifiers 12 are connected in parallel so that the direct-current output from each is combined.

Thus, the strands of wire 30 constituting the first to fourth winding sub-portions 31 to 34 are each wound into a wave winding so as to extend out of first slots 15a at end surfaces of the stator core 15, fold back, and enter second slots 15a six slots away. Each of the strands of wire 30 is wound so as to alternately occupy the inner layer and the outer layer relative to the slot depth direction (the radial direction) in every sixth slot. The first winding sub-portion 31 and the second winding sub-portion 32 are offset by an electrical angle of 180° so as to be inversely wound relative to each other. Similarly, the third winding sub-portion 33 and the fourth winding sub-portion 34 are also offset by an electrical angle of 180° so as to be inversely wound relative to each other.

Furthermore, turn portions 30a of the strands of wire 30 extend outwards from the stator core 15 and fold back to form coil ends. The turn portions 30a which are formed into substantially the same shape at both axial ends of the stator core 15 are mutually spaced circumferentially and radially, and arranged neatly in two rows circumferentially, to form coil end groups 16a and 16b.

Next, the assembly of the stator 8 will be explained with reference to FIGS. 5 to 12.

First, as shown in FIG. 5, twelve long strands of wire 30 are simultaneously bent in the same plane to form a lightning-bolt shape. Then, the winding assemblies 29 shown in FIGS. 7A and 7B, are prepared by progressively folding the strands at right angles, as indicated by the arrow in FIG. 6, using a jig. The winding assemblies 29 are then annealed for ten minutes at 300 degrees so that a parallelepiped core 37 mounted with the winding assemblies 29 can be easily formed into an annular shape.

Moreover, as shown in FIG. 8, each strand of wire 30 is formed by bending it into a planar pattern in which straight portions 30b connected by turn portions 30a are lined up at a pitch of six slots (6P). Adjacent straight portions 30b are offset by a distance equal to one width (W) of the strands of wire 30 by means of the turn portions 30a. The winding assemblies 29 are constructed by arranging six wire-strand pairs so as to be offset by a pitch of one slot from each other, each wire-strand pair consisting of two strands of wire 30 formed in the above pattern which are offset by a pitch of six slots and arranged such that straight portions 30b overlap as shown in FIG. 9. Six end portions of the strands of wire 30 each extend outwards from first and second sides at first and second ends of the winding assemblies 29. Furthermore, the turn portions 30a are arranged so as to line up in rows on first and second side portions of the winding assemblies 29. Moreover, as shown in FIG. 9, the wire-strand pairs, which are arranged so that the straight portions 30b are offset at a pitch of six slots and stacked one on top of another, are offset by an electrical angle of 180°.

The parallelepiped core 37 is prepared as shown in FIGS. 10A and 10B by laminating a predetermined number of sheets of SPCC material formed with trapezoidal slots 37a at a predetermined pitch (an electrical angle of 30°) and laser welding an outer portion thereof.

As shown in FIG. 11A, the insulators 19 are mounted in the slots 37a of the parallelepiped core 37, and the straight portions of the two winding assemblies 29 are inserted so as to stack up within each of the slots. In this manner, the two winding assemblies 29 are installed in the parallelepiped core 37 as shown in FIG. 11B. At this time, straight portions 30b of the strands of wire 30 are housed in lines of four in a radial direction within the slots 15a and are electrically insulated from the parallelepiped core 37 by the insulators 19.

Next, the parallelepiped core 37 is rolled up and its ends abutted and welded to each other to obtain a cylindrical core 38, as shown in FIG. 11C. By rolling up the parallelepiped core 37, the slots 37a (corresponding to the slots 15a in the stator core) take on a generally rectangular cross-sectional shape, and opening portions 37b of the slots 37a (corresponding to opening portions 15b of the slots 15a) become smaller than the slot-width dimensions of the straight portions 30b. Then, both end portions of each strand of wire 30 are joined each other to form the first to fourth winding sub-portions 31 to 34 wound on the same slot group each which has one turn.

Next, turn portions 30a of each of the strands of wire 30 constituting the first to fourth winding sub-portions 31 to 34 are cut between two pairs of slots in which the slots in each pair are six slots apart. Then, the cut ends (first and second end portions 31a, 31b, 32a, 32b, 33a, 33b, 34a, and 34b) of the first to fourth winding sub-portions 31 to 34 are connected to each other based on the connections shown in FIG. 3 to form the six stator winding phase portions 161. Thereafter, the cylindrical core 38 is inserted into a cylindrical outer core 39 formed by laminating SPCC material, then integrated by shrink fitting to obtain the stator shown in FIG. 12. Here, the integrated body formed by the cylindrical core 38 and the outer core 39 corresponds to the stator core 15.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the polyphase stator winding 16, generating electromotive force in the polyphase stator winding 16. This alternating electromotive force passes through the rectifiers 12 and is converted into direct current, the magnitude of the voltage is adjusted by the regulator 18, and the battery is recharged.

At the rear end, external air is drawn in through the air intake openings 2a disposed opposite the heat sinks of the rectifiers 12 and the heat sink 17 of the regulator 18, respectively, by rotation of the fans 5, flowing along the axis of the shaft 6, cooling the rectifiers 12 and the regulator 18, and is then deflected centrifugally by the fans 5, cooling the rear-end coil end group 16b of the polyphase stator winding 16 before being expelled to the outside through the air discharge openings 2b. At the same time, at the front end, external air is drawn in axially through the air intake openings la by rotation of the fans 5, and is then deflected centrifugally by the fans 5, cooling the front-end coil end group 16a of the polyphase stator winding 16 before being expelled to the outside through the air discharge openings 1b.

In this manner, according to Embodiment 1, the polyphase stator winding 16 is provided with a number of first to fourth winding sub-portions 31 to 34 in each of which one strand of wire 30 is bent back outside the slots 15a at end surfaces of the stator core 15 and wound into a wave winding so as to alternately occupy an inner layer and an outer layer in a slot depth direction within every sixth slot 15a. Two winding assemblies 29 each consisting of a pair of first and second winding groups are used, the first winding group being constituted by six first winding sub-portions 31 (or third winding sub-portions 33) disposed at a pitch of one slot from each other, and the second winding group being constituted by six second winding sub-portions 32 (or fourth winding sub-portions 34) disposed at a pitch of one slot from each other and wound inversely so as to be offset at an electrical angle of 180° relative to the first winding sub-portions 31 (or third winding sub-portions 33). The two winding assemblies 29 are installed in the stator core 15 so as to form two rows radially.

Thus, six stator winding phase portions 161 are installed in the stator core 15 by installing the two winding assemblies 29 into the stator core 15 so as to form two rows radially, enabling assembly to be significantly improved.

Because winding connections between the two winding assemblies 29 are formed by two adjacent-address crossover connections and the winding connection within one of the winding assemblies 29 is formed by one same-address crossover connection, the crossover connection portions have an extremely simple construction. Thus, the operations of pulling around and bending the strands of wire 30 to form the crossover connections can be significantly alleviated, greatly improving the connection operation.

Furthermore, because the crossover connection portions in each stator winding phase portion 161 are concentrated into two adjacent slot pairs in which the pairs are six slots apart, the connecting operation is significantly improved.

Thus, because the first to fourth winding sub-portions 31 to 34 constituting the polyphase stator winding 16 are each composed of one strand of wire 30 (continuous wire), it is not necessary to insert a large number of short conductor segments 54 into the stator core 51 and join end portions 54b to each other by welding, soldering, etc., as was required in the conventional stator 50, enabling the productivity of the stator 8 to be improved significantly.

Because the coil ends are constituted by the turn portions 30a of the strands of wire 30, the only joints in the coil end groups 16a and 16b are the first and second end portions of the first to fourth winding sub-portions 31 to 34 and the crossover connection joint portions, significantly reducing the number of joints. Thus, because the occurrence of short-circuiting accidents which accompany loss of insulation due to the joining process can be suppressed, superior insulation can be obtained and high yield can also be achieved. In addition, reductions in resistance to corrosion which accompany loss of insulation due to joining can be suppressed.

Because the two winding assemblies 29 which are composed of continuous wire can be lined up in two rows and inserted into the slots 15a of the stator core 15, assembly is significantly improved compared to the conventional art in which a large number of conductor segments 54 are inserted into the slots separately.

Increases in the number of turns in the polyphase stator winding can be easily adapted for by lining up the straight portions 30b of the winding assemblies 29 which are composed of continuous strands of wire relative to one another and installing them so that they stack up on top of each other.

The stator 8 according to Embodiment 1 can be prepared by inserting the winding assemblies 29 which are composed of continuous wire into the slots 37a in the parallelepiped core 37 through the opening portions 37b and then rolling the parallelepiped core 37 into an annular shape. Thus, because the open dimensions of the opening portions 37b of the slots 37a of the parallelepiped core 37 can be made larger than the dimensions of the strands of wire 30 in the width direction of the slots, the operation of inserting the winding assemblies 29 is improved. Furthermore, because the open dimensions of the opening portions 37b of the parallelepiped core 37 can be made smaller than the dimensions of the strands of wire 30 in the width direction of the slots when the parallelepiped core 37 is rolled up, the space factor is increased, enabling output to be improved. In addition, even if the number of slots is increased, the productivity of the stator will not deteriorate. Furthermore, because there is no need to push the strands of wire 30 into the slots 15a along the axial direction of the stator core 15 as was the case with the conductor segments 54, damage to the insulative coating on the strands of wire 30 does not occur easily, enabling high yield to be realized.

The effects achieved by installing the stator 8 constructed in the above manner into an alternator will be described below.

Because the coil ends are constituted by the turn portions 30a of the strands of wire 30, the number of joints in the coil end groups 16a and 16b is significantly reduced. Thus, the strands of wire 30 are not softened by welding, raising the rigidity of the stator as a whole and enabling magnetic noise to be reduced.

The coil end groups 16a and 16b are constructed by arranging the turn portions 30a in rows circumferentially. Thus, compared to the conventional coil end groups in which the end portions 54b of the conductor segments 54 were joined to each other, the height to which the coil end groups extend outwards from the stator core 15 can be reduced. Thus, wind resistance in the coil end groups 16a and 16b is reduced, enabling the reduction of wind noise due to the rotation of the rotor 7. Coil leakage reactance in the coil ends is also reduced, improving output and efficiency.

Four strands of wire 30 are arranged so as to line up in a row radially within each slot 15a, and the turn portions 30a are arranged to line up in two rows circumferentially. Thus, the turn portions 30a constituting the coil end groups 16a and 16b are each divided into two rows radially, enabling the height to which the coil end groups 16a and 16b extend outwards from the stator core 15 to be reduced. As a result, wind resistance in the coil end groups 16a and 16b is reduced, enabling the reduction of wind noise due to the rotation of the rotor 7.

The turn portions 30a which fold back at the end surfaces of the stator core 15 each connect two straight portions 30b disposed in different layers in different slots 15a six slots apart. Thus, because interference between the coil ends in each phase is suppressed and the space factor of the stator winding is increased, increased output can be achieved. Furthermore, each of the turn portions 30a can be easily formed into a generally identical shape. Because circumferential irregularities on radially inner edge surfaces of the coil end groups 16a and 16b can be suppressed by forming each of the turn portions 30a into a generally identical shape, that is, by forming the turn portions 30a which constitute the coil end groups 16a and 16b into a generally identical shape circumferentially, wind noise generated between the rotor 7 and the coil end groups 16a and 16b can be reduced. Furthermore, leak inductance becomes uniform, stabilizing output. Furthermore, because the turn portions 30a are spaced in the circumferential direction, and the spaces between the turn portions 30a in the circumferential direction are formed to be generally identical, the passage of cooling air inside the coil end groups 16a and 16b is facilitated, improving cooling and reducing noise due to interference between the cooling air and the coil ends.

Because the turn portions 30a are formed with a generally identical shape and arranged in rows in the circumferential direction, heat dissipation from each of the turn portions 30a is even, and in addition, heat dissipation from each of the coil end groups 16a and 16b is also even. Thus, heat generated in the polyphase stator winding 16 is radiated uniformly from each of the turn portions 30a and radiated uniformly from both coil end groups 16a and 16b, improving the cooling of the polyphase stator winding 16.

Because the slot pitch into which the strands of wire 30 are wound corresponds to the pitch of the N and S poles in the rotor 7, the winding is a full-pitch winding, enabling high output to be achieved.

Because the open dimensions of the opening portions 15b of the slots 15a are constructed so as to be smaller than the dimensions of the strands of wire 30 in the width direction of the slots 15a, the strands of wire 30 are prevented from popping out of the slots 15a towards the radial inside, and noise at the opening portions 15b due to interference with the rotor 7 can be reduced.

Because the straight portions 30b are formed with a rectangular cross section, the cross-sectional shape of the straight portions 30b fits neatly into the shape of the slots 15a when the straight portions 30b are housed inside the slots 15a. Thus, the space factor of the strands of wire 30 inside the slots 15a is easily increased, enabling improved transfer of heat from the strands of wire 30 to the stator core 15. Because the strands of wire 30 are formed with a rectangular cross section, the surface area radiating heat from the turn portions 30a constituting the coil ends is increased, efficiently radiating heat generated by the polyphase stator winding 16. In addition, by disposing the long sides of the rectangular cross section parallel to the radial direction, gaps can be ensured between the turn portions 30b, making it possible for the cooling air to pass inside the coil end groups 16a and 16b and reducing wind resistance in the radial direction. Here in Embodiment 1, the strands of wire 30 are formed with a rectangular cross section, but the cross-sectional shape of the strands of wire 30 is not limited to a rectangular cross section and may be any generally flattened shape such as an elongated elliptical shape in which the short sides of a rectangle are made into arcs, or an oblong shape, etc.

The rotor 7 has sixteen magnetic poles, and ninety-six (96) slots 15a are formed at a uniform angular pitch in the stator core 15. Because the strands of wire 30 are wave-wound into every sixth slot 15a, the pitch of the slots into which the strands of wire 30 are wave-wound corresponds to the pitch of the N and S poles. Thus, maximum torque can be achieved, enabling increased output.

As shown in FIG. 4, the two three-phase stator winding portions 160 are constructed by forming three stator winding phase portions 161 into each of two star connections, each of the three stator winding phase portions 161 being constructed by connecting the first to fourth winding sub-portions 31 to 34 in series, each of these two three-phase stator winding portions 160 is connected to its own rectifier 12, and in addition, the outputs from the two rectifiers 12 are connected in parallel. Thus, the direct current outputs of the four-turn three-phase stator winding portions 160 can be combined and extracted, solving the problem of insufficient power generation in low rotational frequency regions.

Because the height of the coil end groups 16a and 16b is low and there are not many joint portions, noise caused by interference between the coil end groups 16a and 16b and the cooling airflow formed by the fans 5 due to rotation of the rotor 7 is reduced. Because the shape of both coil end groups 16a and 16b is generally identical and the fans 5 are disposed on both ends of the rotor 7, the coil end groups 16a and 16b are cooled in a balanced manner, reducing the temperature of the stator winding uniformly and greatly.

Now, the fans 5 do not have to be disposed on both ends of the rotor 7, they may be disposed in consideration of the positions of the stator winding or the rectifiers which are large heat-generating bodies. For example, the coil ends of the stator winding which are large heat generating bodies may be disposed on the discharge side of a fan with a large cooling speed, and a fan may be disposed on an end portion of the rotor at the end where the rectifiers are disposed. Furthermore, when mounted to an automotive engine, because the pulley is normally connected to a crankshaft by means of a belt, the fan may be disposed at the end away from the pulley so that the cooling exhaust from the fan does not affect the belt. Moreover, shoulder portions of the claw-shaped magnetic poles of the rotor have a wind conveying action and can be used as a cooling means.

Because the direction of inclination of the strands of wire 30 constituting the inner circumferential side of the coil end group 16a is parallel to the direction of inclination of the strands of wire 30 constituting the inner circumferential side of the coil end group 16b, axial flow of cooling air through the case 3 turns along the direction of inclination of the strands of wire 30. Thus, the axial airflow generated by the rotation of the rotor 7 is controlled.

In other words, if the strands of wire 30 constituting the inner circumferential side of the coil end groups 16a and 16b are inclined along the direction resulting from the combination of a component of the cooling airflow in a direction of rotation of the rotor 7 and a component of the axial flow of the cooling air, axial flow of the cooling air is promoted. Thus, because the rotor coil 13 is efficiently cooled, the temperature of the rotor coil 13 decreases, enabling the field current to be increased and output improved. In that case, because the strands of wire 30 constituting the inner circumferential side of the coil end groups 16a and 16b are inclined along the component of the axial flow of cooling air, wind noise due to interference is also reduced.

On the other hand, if the strands of wire 30 constituting the inner circumferential side of the coil end groups 16a and 16b are inclined along the direction resulting from the combination of a component of the cooling airflow in a direction of rotation of the rotor 7 and a component against the axial flow of the cooling air, axial flow of the cooling air is reduced. Thus, the amount of air discharged radially is increased, improving the cooling of the coil ends disposed on the discharge side.

Because the axial length of the stator 8, including the coil ends, is shorter than the pole cores 20 and 21, compactness can be achieved. When fans 5 are disposed on both end portions of the rotor 7, because there are no coil ends on the discharge side of the fans, wind resistance is significantly reduced, thereby reducing wind noise and suppressing temperature increases in internal parts requiring cooling, such as the rectifiers 12.

The number of slots housing the polyphase stator winding 16 is two per pole per phase, and there are two three-phase stator winding portions 160 each corresponding to the number of slots per pole per phase. Thus, the magnetomotive wave form can be made to approximate a sinusoidal wave, reducing higher harmonic wave components and ensuring stable output. Because the number of slots 15a is increased, teeth in the stator core 15 are slender, reducing magnetic leakage through teeth straddling the facing claw-shaped magnetic poles 22 and 23, enabling surges in output to be suppressed. Furthermore, because a greater number of slots 15a means a correspondingly greater number of turn portions 30a, heat dissipation from the coil end groups is improved.

Because the slots 15a and the opening portions 15b are arranged to be evenly spaced at an electrical angle of 30°, magnetic pulsation which result in excitation forces which cause magnetic noise can be reduced.

Moreover, in Embodiment 1 above, end portions of each of the strands of wire 30 in the first to fourth winding sub-portions 31 to 34 are joined to each other to form one turn of winding, then some of the turn portions 30b of the strands of wire 30 constituting the first to fourth winding sub-portions 31 to 34 are cut, and the cut ends are used to crossover-connect, but the end portions of each of the strands of wire 30 in the first to fourth winding sub-portions 31 to 34 may also be used to crossover-connect. In that case, the number of joints is further reduced and the cutting operation becomes unnecessary.

Embodiment 2

Figure 13:
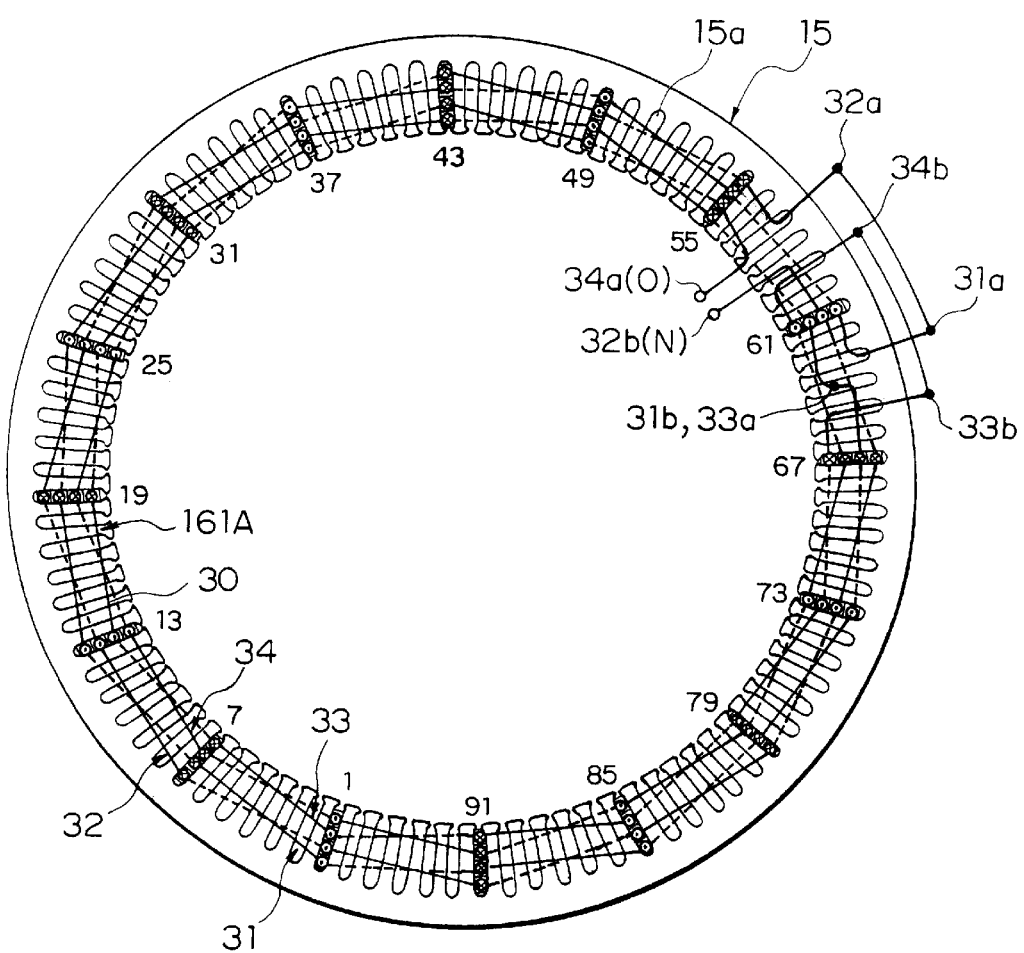
FIG. 13 is an end elevation explaining connections in one stator winding phase portion in an automotive alternator according to Embodiment 2 of the present invention.

FIG. 13 is an end elevation showing connections in one stator winding phase portion in the automotive alternator according to Embodiment 2 of the present invention.

In FIG. 13, one stator winding phase portion 161A is constituted by first to fourth winding sub-portions 31 to 34 each composed of one strand of wire 30. The first winding sub-portion 31 is formed by wave winding one strand of wire 30 into every sixth slot from slot numbers 1 to 91 so as to alternately occupy a first position from an outer circumferential side and a second position from the outer circumferential side inside the slots 15a. The second winding sub-portion 32 is formed by wave winding a strand of wire 30 into every sixth slot from slot numbers 1 to 91 so as to alternately occupy the second position from the outer circumferential side and the first position from the outer circumferential side inside the slots 15a. The third winding sub-portion 33 is formed by wave winding a strand of wire 30 into every sixth slot from slot numbers 1 to 91 so as to alternately occupy a third position from the outer circumferential side and a fourth position from the outer circumferential side inside the slots 15a. The fourth winding sub-portion 34 is formed by wave winding a strand of wire 30 into every sixth slot from slot numbers 1 to 91 so as to alternately occupy the fourth position from the outer circumferential side and the third position from the outer circumferential side inside the slots 15a.

Thus, each of the first to fourth winding sub-portions 31 to 34 constitutes a winding sub-portion having one turn in which a single strand of wire 30 is wound into every sixth slot 15a so as to alternately occupy an inner layer and an outer layer in a slot-depth direction.

At the first end of the stator core 15, a second end portion 31b of the first winding sub-portion 31 extending outwards from the second position from the outer circumferential side of slot number 67 and a first end portion 33a of the third winding sub-portion 33 extending outwards from the third position from the outer circumferential side of slot number 61 are crossover-connected (adjacent-address crossover connection), then a second end portion 33b of the third winding sub-portion 33 extending outwards from the fourth position from the outer circumferential side of slot number 61 and a second end portion 34b of the fourth winding sub-portion 34 extending outwards from the fourth position from the outer circumferential side of slot number 61 are crossover-connected (same-address crossover connection), and in addition, a first end portion 31a of the first winding sub-portion 31 extending outwards from the first position from the outer circumferential side of slot number 61 and a first end portion 32a of winding sub-portion 32 extending outwards from the first position from the outer circumferential side of slot number 55 are crossover-connected (same-address crossover connection). Thus, the first to the fourth winding sub-portions 31 to 34 are connected in series to form one stator winding phase portion 161A having four turns.

At this time, the second end portion 32b of the second winding sub-portion 32 extending outwards from the second position from the outer circumferential side of slot number 61 and the end portion 34a of the fourth winding sub-portion 34 extending outwards from the third position from the outer circumferential side of slot number 55 become an output wire (O) and a neutral point (N), respectively, of the stator winding phase portion 161A.

As explained above, each stator winding phase portion 161A according to Embodiment 2 of the present invention is constructed in the same way as the stator winding phase portion 161 in Embodiment 1 above except for the crossover connection method of the first to the fourth winding sub-portions 31 to 34.

More specifically, in Embodiment 2 of the present invention, two stator winding assemblies 29 are wound in the stator core 15 in two rows in a radial direction. Then, each stator winding phase portion 161A having four turns is formed by connecting between the winding sub-portions within each of the winding assemblies 29 by two adjacent-address crossover connections and by connecting between the winding sub-portions between the two winding assemblies 29 by one same-address crossover connection. Thus, the same effects as in Embodiment 1 can also be achieved in Embodiment 2.

Embodiment 3

Figure 14:
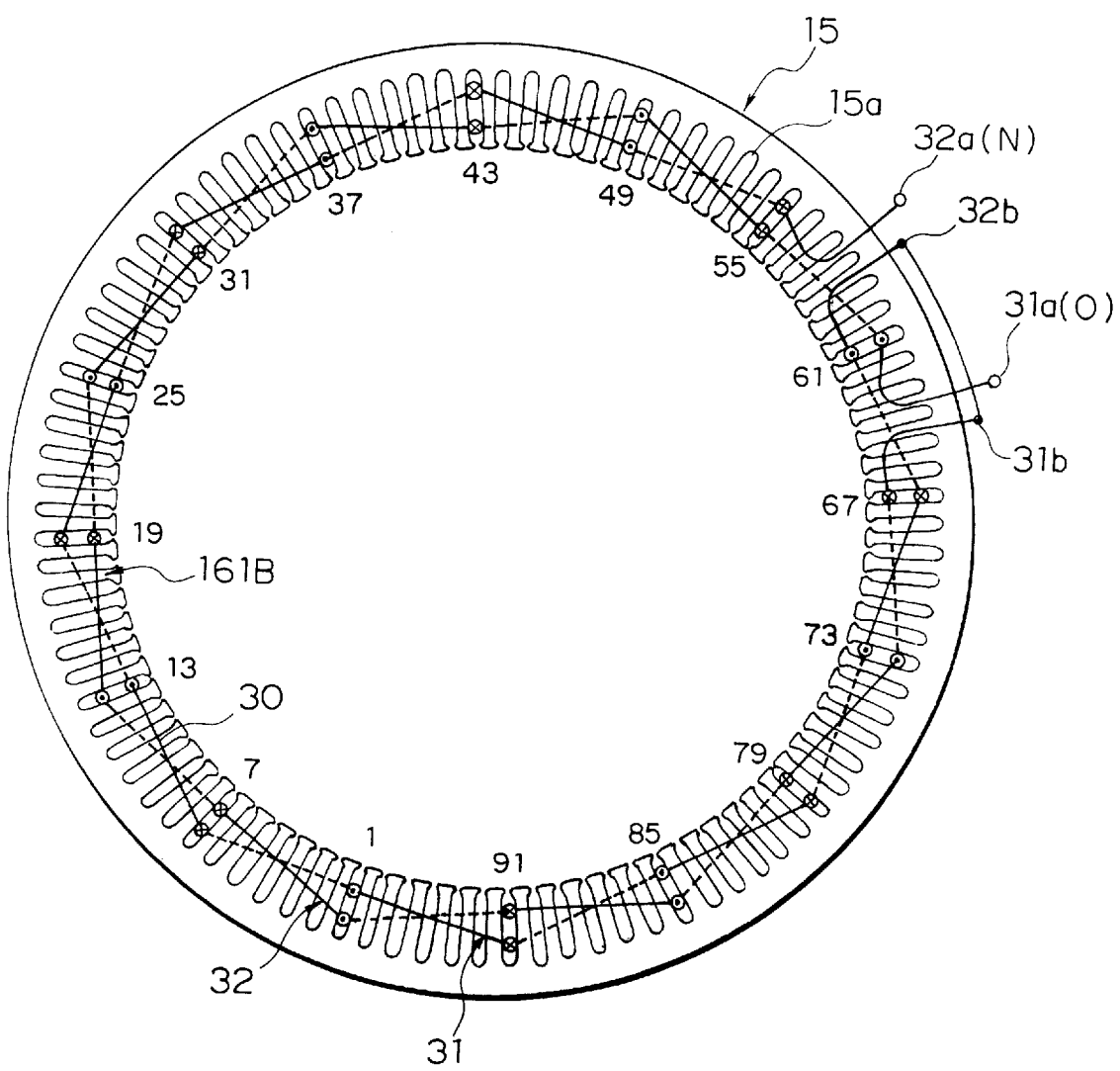
FIG. 14 is an end elevation explaining connections in one stator winding phase portion in an automotive alternator according to Embodiment 3 of the present invention.

FIG. 14 is an end elevation showing connections in one stator winding phase portion in an automotive alternator according to Embodiment 3 of the present invention.

In FIG. 14, one stator winding phase portion 161B is constituted by first and second winding sub-portions 31 and 32 each composed of one strand of wire 30. The first winding sub-portion 31 is formed by wave winding one strand of wire 30 into every sixth slot from slot numbers 1 to 91 so as to alternately occupy a first position from an outer circumferential side and a second position from the outer circumferential side inside the slots 15a. The second winding sub-portion 32 is formed by wave winding a strand of wire 30 into every sixth slot from slot numbers 1 to 91 so as to alternately occupy the second position from the outer circumferential side and the first position from the outer circumferential side inside the slots 15a.

Thus, each of the first and second winding sub-portions 31 and 32 constitutes a winding sub-portion having one turn in which a single strand of wire 30 is wound into every sixth slot 15a so as to alternately occupy an inner layer and an outer layer in a slot-depth direction.

At the first end of the stator core 15, a second end portion 31b of the first winding sub-portion 31 extending outwards from the second position from the outer circumferential side of slot number 67 and a second end portion 32b of the second winding sub-portion 32 extending outwards from the third position from the outer circumferential side of slot number 61 are crossover-connected (same-address crossover connection). Thus, the first and second winding sub-portions 31 and 32 are connected in series to form one stator winding phase portion 161B having two turns.

At this time, the first end portion 31a of the first winding sub-portion 31 extending outwards from the first position from the outer circumferential side of slot number 61 and the first end portion 32a of the second winding sub-portion 32 extending outwards from the first position from the outer circumferential side of slot number 55 become an output wire (O) and a neutral point (N), respectively, of the stator winding phase portion 161B.

As explained above, each stator winding phase portion 161B according to Embodiment 3 of the present invention is constructed in the same way as the stator winding phase portion 161 in Embodiment 1 above except for the crossover connection method of the first and second winding sub-portions 31 and 32.

More specifically, in Embodiment 3 of the present invention, one stator winding assembly 29 is installed in the stator core 15. Then, each stator winding phase portion 161A having two turns is formed by connecting between the winding sub-portions within the single winding assembly 29 using one same-address crossover connection. Thus, the same effects as in Embodiment 1 can also be achieved in Embodiment 3.

Embodiment 4

Figure 15:
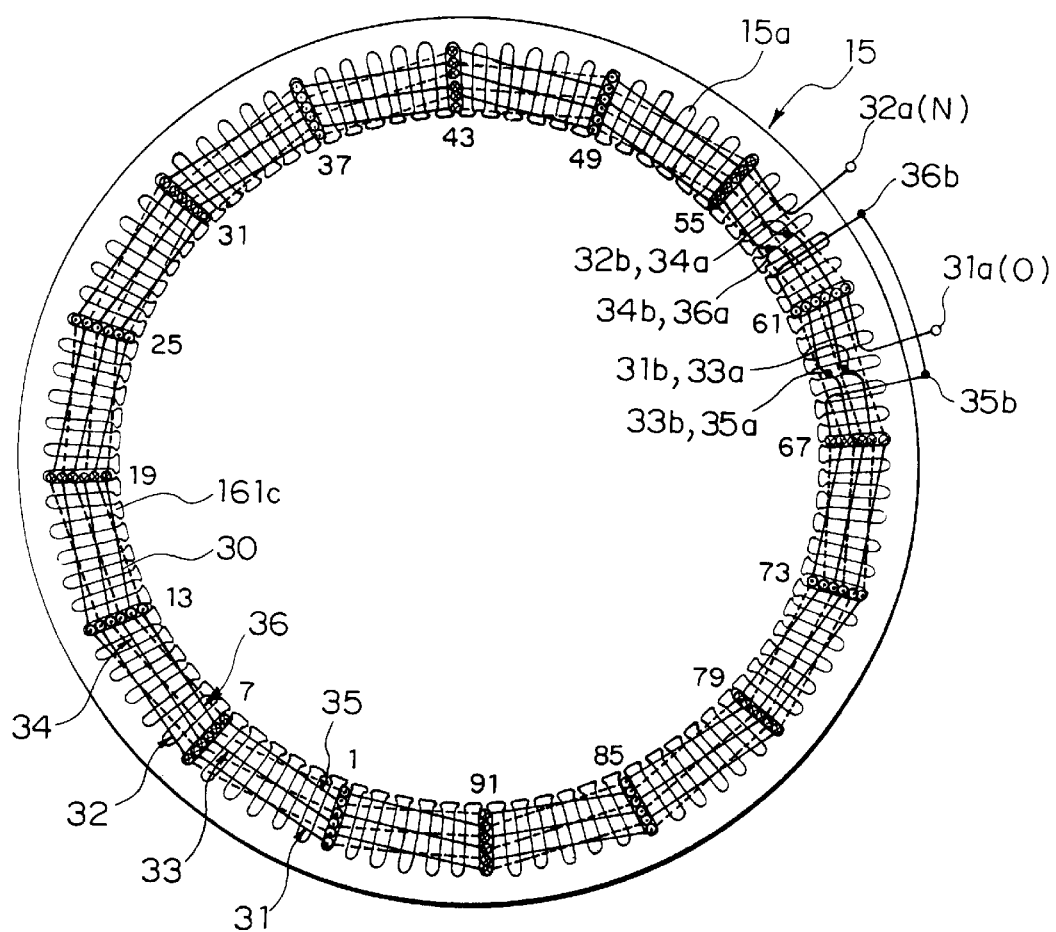
FIG. 15 is an end elevation explaining connections in one stator winding phase portion in an automotive alternator according to Embodiment 4 of the present invention.

FIG. 15 is an end elevation showing connections in one stator winding phase portion in the automotive alternator according to Embodiment 4 of the present invention.

In FIG. 15, one stator winding phase portion 161C is constituted by first to sixth winding sub-portions 31 to 36 each composed of one strand of wire 30. The first winding sub-portion 31 is formed by wave winding one strand of wire 30 into every sixth slot from slot numbers 1 to 91 so as to alternately occupy a first position from an outer circumferential side and a second position from the outer circumferential side inside the slots 15a. The second winding sub-portion 32 is formed by wave winding a strand of wire 30 into every sixth slot from slot numbers 1 to 91 so as to alternately occupy a second position from the outer circumferential side and a first position from the outer circumferential side inside the slots 15a. The third winding sub-portion 33 is formed by wave winding a strand of wire 30 into every sixth slot from slot numbers 1 to 91 so as to alternately occupy a third position from the outer circumferential side and a fourth position from the outer circumferential side inside the slots 15a. The fourth winding sub-portion 34 is formed by wave winding a strand of wire 30 into every sixth slot from slot numbers 1 to 91 so as to alternately occupy a fourth position from the outer circumferential side and a third position from the outer circumferential side inside the slots 15a. The fifth winding sub-portion 35 is formed by wave winding a strand of wire 30 into every sixth slot from slot numbers 1 to 91 so as to alternately occupy a fifth position from the outer circumferential side and a sixth position from the outer circumferential side inside the slots 15a. The sixth winding sub-portion 36 is formed by wave winding a strand of wire 30 into every sixth slot from slot numbers 1 to 91 so as to alternately occupy a sixth position from the outer circumferential side and a fifth position from the outer circumferential side inside the slots 15a.

Thus, each of the first to sixth winding sub-portions 31 to 36 constitutes a winding sub-portion having one turn in which a single strand of wire 30 is wound into every sixth slot 15a so as to alternately occupy an inner layer and an outer layer in a slot-depth direction.

At a first end of the stator core 15, a second end portion 31b of the first winding sub-portion 31 extending outwards from the second position from the outer circumferential side of slot number 67 and a first end portion 33a of the third winding sub-portion 33 extending outwards from the third position from the outer circumferential side of slot number 61 are crossover-connected (adjacent-address crossover connection), a second end portion 33b of the third winding sub-portion 33 extending outwards from the fourth position from the outer circumferential side of slot number 67 and a first end portion 35a of the fifth winding sub-portion 35 extending outwards from the fifth position from of the outer circumferential side of slot number 61 are crossover-connected (adjacent-address crossover connection), then a second end portion 32b of the second winding sub-portion 32 extending outwards from the second position from the outer circumferential side of slot number 61 and a first end portion 34a of the fourth winding sub-portion 34 extending outwards from the third position from the outer circumferential side of slot number 55 are crossover-connected (adjacent-address crossover connection), then a second end portion 34b of the fourth winding sub-portion 34 extending outwards from the fourth position from the outer circumferential side of slot number 61 and a first end portion 36a of the sixth winding sub-portion 36 extending outwards from the fifth position form the outer circumferential side of slot number 55 are crossover-connected (adjacent-address crossover connection), then a second end portion 35b of the fifth winding sub-portion 35 extending outwards from the sixth position from the outer circumferential side of slot number 67 and a second end portion 36*b* of the sixth winding sub-portion 36 extending outwards from the sixth position form the outer circumferential side of slot number 61 are crossover-connected (same-address crossover connection). Thus, the first to the sixth winding sub-portions 31 to 36 are connected in series to form one stator winding phase portion 161C having six turns.

At this time, a first end portion 31*a* of the first winding sub-portion 31 extending outwards from the first position from the outer circumferential side of slot number 61 and a first end portion 32*a* of the second winding sub-portion 32 extending outwards from the first position from the outer circumferential side of slot number 55 become an output wire (O) and a neutral point (N), respectively, of the stator winding phase portion 161A.

As explained above, each stator winding phase portion 161C according to Embodiment 4 of the present invention is constructed in the same way as the stator winding phase portion 161 in Embodiment 1 above except for the number of turns and the crossover connection method of the first to sixth winding sub-portions 31 to 36.

More specifically, in Embodiment 4 of the present invention, three stator winding assemblies 29 are wound in the stator core 15 in three rows in a radial direction. Then, each stator winding phase portion 161C having six turns is formed by connecting between the winding sub-portions within one of the winding assemblies 29 by one adjacent-address crossover connection and by connecting between the winding sub-portions between adjacent winding assemblies 29 by four same-address crossover connections. Thus, the same effects as in Embodiment 1 can also be achieved in Embodiment 4.

Embodiment 5

Figure 16:
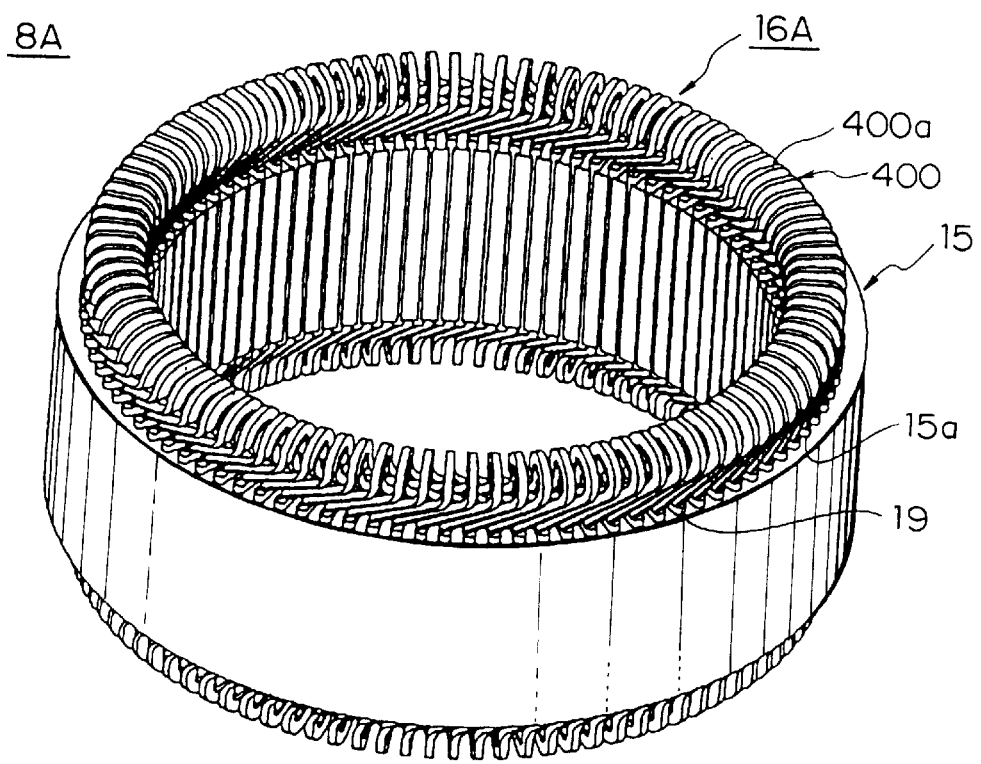
FIG. 16 is a perspective showing a stator of an automotive alternator according to Embodiment 5 of the present invention.

FIG. 16 is a perspective showing a stator of the automotive alternator according to Embodiment 5 of the present invention. Moreover, in FIG. 16, output wires, crossover connections, etc. have been omitted.

In FIG. 16, a stator 8A includes: a stator core 15; a polyphase stator winding 16A wound onto the stator core 15; and insulators 19 mounted inside slots 15*a*, the insulators 19 electrically insulating the polyphase stator winding 16A from the stator core 15. The polyphase stator winding 16A includes a number of winding sub-portions in each of which a strand of wire 40 (400) is wound so as to alternately occupy an inner layer and an outer layer in a slot depth direction within the slots 15*a* at intervals of a predetermined number of slots, the strands of wire 40 (400) folding back outside the slots at axial end surfaces of the stator core 15. In Embodiment 5 of the present invention also, ninety-six slots 51*a* are formed at even pitch so as to house two three-phase stator winding portions such that the number of slots housing each winding portion corresponds to the number of magnetic poles (sixteen) in a rotor (not shown).

Moreover, because the polyphase stator winding 16A is formed such that the winding sub-portions formed by the strands of wire 40 are enveloped by the winding sub-portions formed by the strands of wire 400, the strands of wire 40 cannot be seen in FIG. 16 as they are covered by the turn portions 400*a* of the strands of wire 400.

Figure 17:
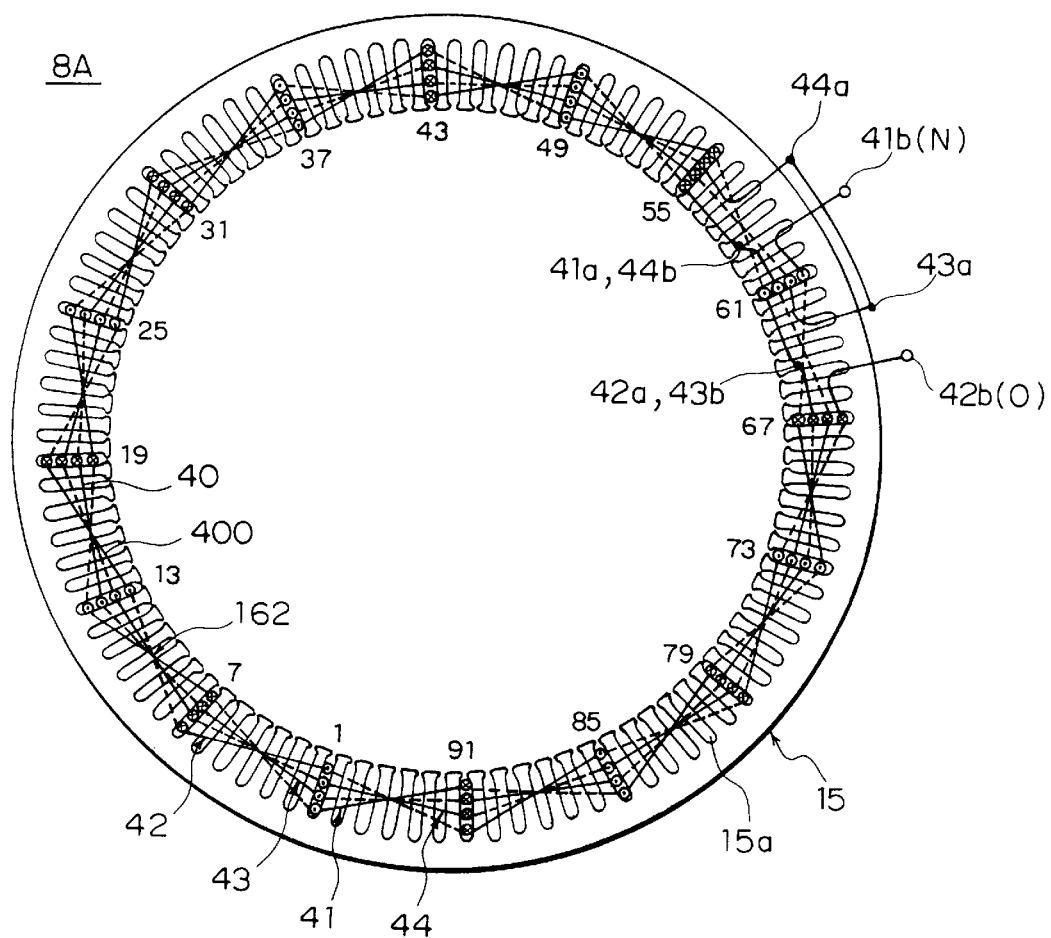
FIG. 17 is an end elevation explaining connections in one stator winding phase portion in the automotive alternator according to Embodiment 5 of the present invention.

Next, the construction of the windings in one stator winding phase portion 162 will be explained with reference to FIG. 17.

One stator winding phase portion 162 is constituted by first and second winding sub-portions 41 and 42 each composed of one strand of wire 400, and by third and fourth winding sub-portions 43 and 44 each composed of one strand of wire 40. Because the strands of wire 40 and 400 are composed of the same material, copper wire material having a rectangular cross-section coated with insulation, for example, can be used.

The first winding sub-portion 41 is formed by wave winding one strand of wire 400 into every sixth slot from slot numbers 1 to 91 so as to alternately occupy a first position from an outer circumferential side and a fourth position from the outer circumferential side inside the slots 15*a*. The second winding sub-portion 42 is formed by wave winding a strand of wire 400 into every sixth slot from slot numbers 1 to 91 so as to alternately occupy the fourth position from the outer circumferential side and the first position from the outer circumferential side inside the slots 15*a*. The third winding sub-portion 43 is formed by wave winding a strand of wire 40 into every sixth slot from slot numbers 1 to 91 so as to alternately occupy a second position from the outer circumferential side and a third position from the outer circumferential side inside the slots 15*a*. The fourth winding sub-portion 44 is formed by wave winding a strand of wire 40 into every sixth slot from slot numbers 1 to 91 so as to alternately occupy the third position from the outer circumferential side and the second position from the outer circumferential side inside the slots 15*a*.

Thus, each of the first to fourth winding sub-portions 41 to 44 constitutes a winding sub-portion having one turn in which a single strand of wire 400 (or 40) is wound into every sixth slot 15*a* so as to alternately occupy an inner layer and an outer layer in a slot-depth direction. The strands of wire 400 and 40 are arranged to line up in a row of four strands in a radial direction within each slot 15*a* with the longitudinal direction of their rectangular cross sections aligned in a radial direction.

At a first end of the stator core 15, a second end portion 43*b* of the third winding sub-portion 43 extending outwards from the third position from the outer circumferential side of slot number 67 and a first end portion 42*a* of the second winding sub-portion 42 extending outwards from the fourth position from the outer circumferential side of slot number 61 are crossover-connected (adjacent-address crossover connection), then a second end portion 44*b* of the fourth winding sub-portion 44 extending outwards from the third position from the outer circumferential side of slot number 61 and a first end portion 41*a* of the first winding sub-portion 41 extending outwards from the fourth position from of the outer circumferential side of slot number 55 are crossover-connected (adjacent-address crossover connection), and in addition, a first end portion 43*a* of the third winding sub-portion 43 extending outwards from the second position from the outer circumferential side of slot number 61 and a first end portion 44*a* of fourth winding sub-portion 44 extending outwards from the second position from the outer circumferential side of slot number 55 are crossover-connected (same-address crossover connection). Thus, the first to the fourth winding sub-portions 41 to 44 are connected in series to form one stator winding phase portion 162 having four turns.

At this time, the second end portion 42*b* of the second winding sub-portion 42 extending outwards from the first position from the outer circumferential side of slot number 67 and the second end portion 41*b* of the first winding sub-portion 41 extending outwards from the first position from the outer circumferential side of slot number 61 become an output wire (O) and a neutral point (N), respectively, of the stator winding phase portion 162.

A total of six stator winding phase portions 162 are similarly formed by offsetting the slots 15*a* into which the strands of wire 40 and 400 are wound one slot at a time. Then, as in Embodiment 1 above, three stator winding phase portions 162 are connected into each of two star connections to form the two three-phase stator windings, as shown in FIG. 4, and each of the three-phase stator winding portions is connected to its own rectifier 12. The rectifiers 12 are connected in parallel so that the direct-current output from each is combined.

Thus, the strands of wire 40 and 400 constituting the first to fourth winding sub-portions 41 to 44 are each wound into a wave winding so as to extend out of first slots 15a at end surfaces of the stator core 15, fold back, and enter second slots 15a six slots away. Each of the strands of wire 40 and 400 is wound so as to alternately occupy the inner layer and the outer layer relative to the slot depth direction (the radial direction) in every sixth slot. The first winding sub-portion 41 and the second winding sub-portion 42 are offset by an electrical angle of 180° so as to be inversely wound relative to each other. Similarly, the third winding sub-portion 43 and the fourth winding sub-portion 44 are also offset by an electrical angle of 180° so as to be inversely wound relative to each other.

Next, the assembly of a stator 8A will be explained with reference to FIGS. 18 to 23.

Figure 18:
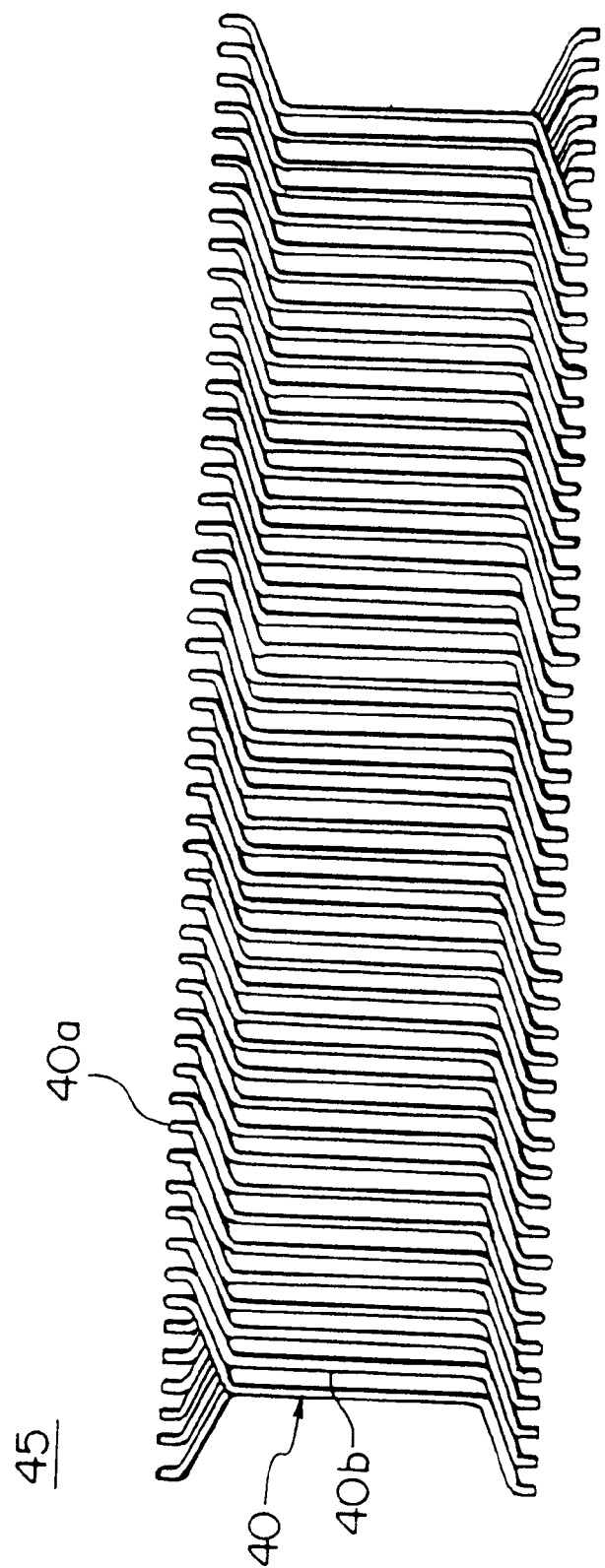
FIG. 18 is a plan showing a first winding assembly constituting part of the stator winding used in the automotive alternator according to Embodiment 5 of the present invention.
Figure 19:
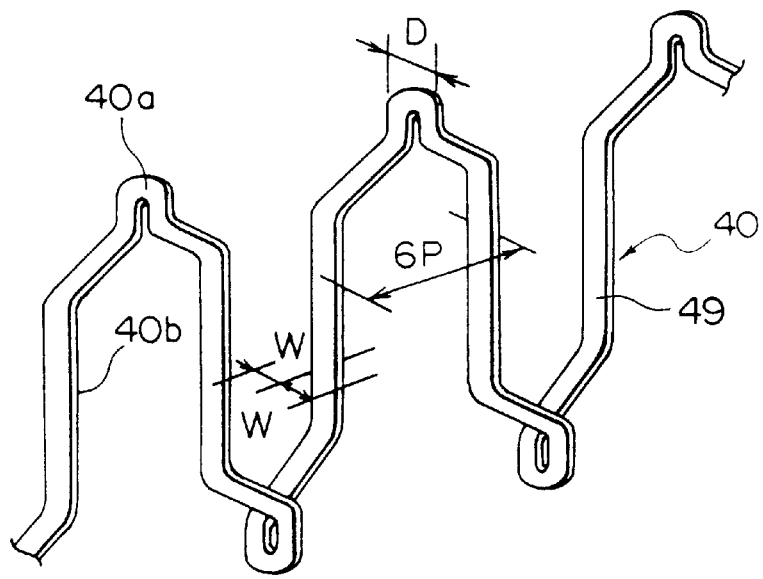
FIG. 19 is a perspective explaining the shape of a strand of wire constituting part of the first winding assembly.

First, the first winding assembly 45 is formed by bending twelve long strands of wire 40 as shown in FIG. 18. As shown in FIG. 19, each strand of wire 40 is formed by bending it into a planar pattern in which straight portions 40b connected by turn portions 40a are lined up at a pitch of six slots (6P). Adjacent straight portions 40b are offset by a distance equal to one width (W) of the strands of wire 40 by means of the turn portions 40a.

Figure 20:
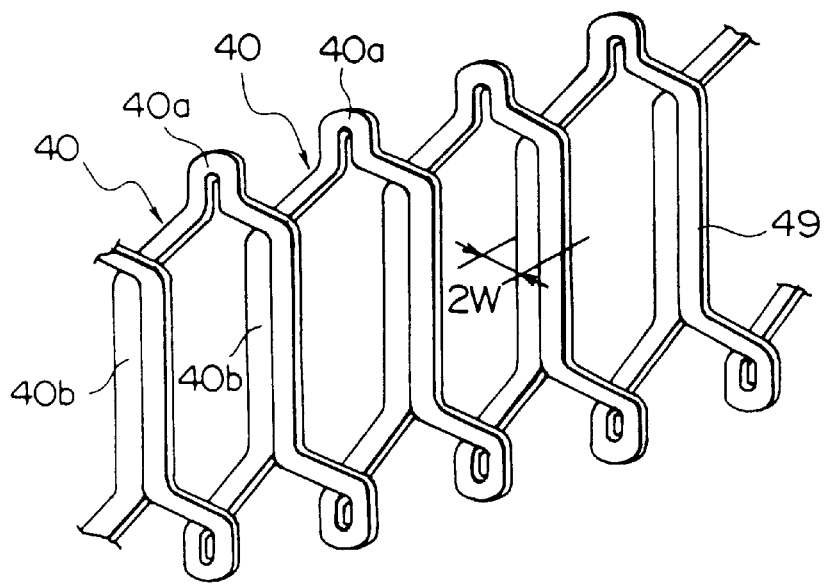
FIG. 20 is a perspective explaining arrangement of the strands of wire in the first winding assembly.

The first winding assembly 45 is constructed by arranging six wire-strand pairs so as to be offset by a pitch of one slot from each other, each wire-strand pair consisting of two strands of wire 40 formed in the above pattern which are offset by a pitch of six slots and arranged such that the straight portions 40b overlap as shown in FIG. 20. Furthermore, the turn portions 40a are arranged so as to line up in rows on first and second side portions of the first winding assembly 45.

Figure 21:
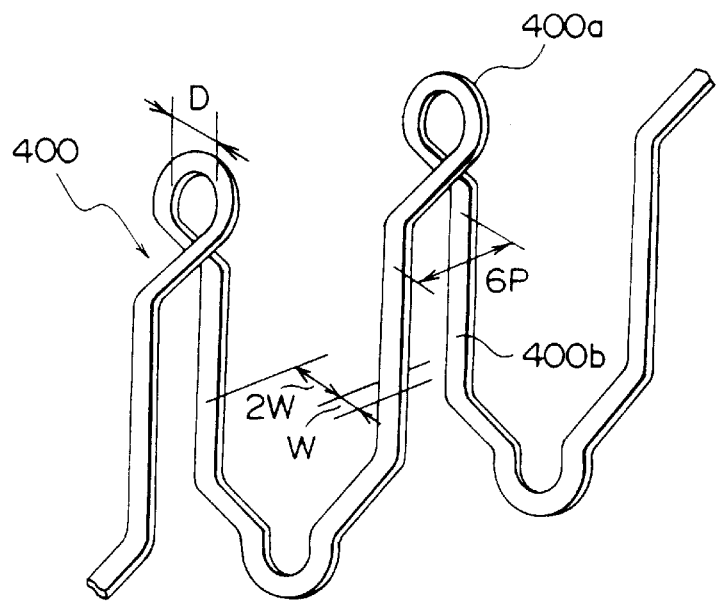
FIG. 21 is a perspective explaining the shape of a strand of wire constituting part of a second winding assembly constituting part of the stator winding used in the automotive alternator according to Embodiment 5 of the present invention.

Next, although not shown, a second winding assembly is formed by bending twelve long strands of wire 400. As shown in FIG. 21, each strand of wire 400 is formed by bending it into a planar pattern in which straight portions 400b connected by turn portions 400a are lined up at a pitch of six slots (6P). Adjacent straight portions 400b are offset by substantially twice the width (2W) of the strands of wire 400 by means of the turn portions 400a. Furthermore, the inside diameter of the turn portions 400a of the strands of wire 400 constituting the second winding assembly is formed to be generally equal to the outside diameter (D) of the turn portions 40a of the strands of wire 40 constituting the first winding assembly 45.

Figure 22:
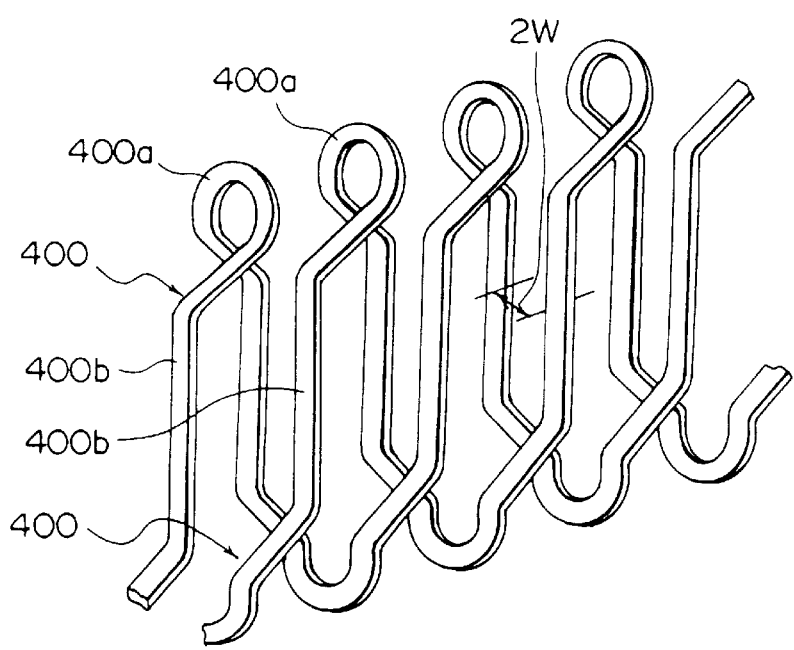
FIG. 22 is a perspective explaining arrangement of the strands of wire in the second winding assembly.

The second winding assembly is constructed by arranging six wire-strand pairs so as to be offset by a pitch of one slot from each other, each wire-strand pair consisting of two strands of wire 400 formed in the above pattern which are offset by a pitch of six slots and arranged such that straight portions 400b overlap as shown in FIG. 22. The turn portions 400a of the strands of wire 400 are arranged so as to line up in rows on first and second side portions of the second winding assembly.

Moreover, the strands of wire 400 in the second winding assembly are identical to the strands of wire 40 in the first winding assembly 45. Except for differences in the diameter of the turn portions 400a and the amount of offset of the straight portions 400b, the second winding assembly has the same construction as the first winding assembly 45.

Figure 23:
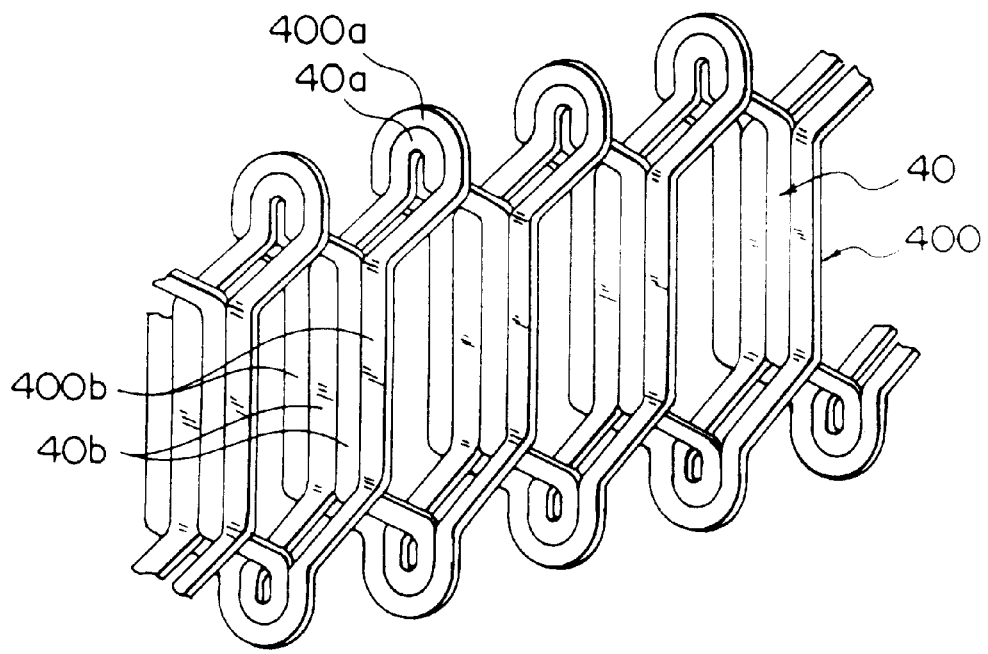
FIG. 23 is a perspective explaining arrangement of the strands of wire in the stator winding used in the automotive alternator according to Embodiment 5 of the present invention.

Next, the first winding assembly 45 constructed in this manner is inserted inside the second winding assembly to obtain a double winding assembly group. At this time, the turn portions 400a of the second winding assembly are positioned within the double winding assembly group so as to surround the turn portions 40b of the first winding assembly 45, and the straight portions 400b of second winding assembly are positioned on both sides of the straight portions 40b of the first winding assembly 45 as shown in FIG. 23. Moreover, FIG. 23 shows part of the first to fourth winding sub-portions 41 to 44 constituting one stator winding phase portion 162.

Next, although not shown, the insulators 19 are mounted in the slots 37a of the parallelepiped core 37, and the double winding assembly group is installed in the parallelepiped core 37 by inserting the straight portions 40b and 400b of the double winding assembly group into each of the slots 37a. In this manner, the straight portions 40b and 400b of the strands of wire 40 and 400 are housed in lines of four in a radial direction within the slots 37a and are electrically insulated from the parallelepiped core 37 by the insulators 19.

After that, the parallelepiped core 37 is rolled up and its ends abutted and laser welded to each other to obtain a cylindrical core 38. Then, the polyphase stator winding 16A is formed by connecting the end portions of the strands of wire 40 and 400 based on the connections shown in FIG. 17. Thereafter, the cylindrical core 38 is inserted into a cylindrical outer core 39 composed of laminated SPCC material and integrated by shrink fitting to obtain the stator 8A shown in FIG. 16.

In the stator 8A constructed in this manner, the strands of wire 40 and 400 constituting the first to fourth winding sub-portions 41 to 44 are each wound into a wave winding so as to extend out of first slots 15a at end surfaces of the stator core 15, fold back, and enter second slots 15a six slots away. Then, the turn portions 40a and 400a of the strands of wire 40 and 400 extend outwards from the stator core 15 and fold back to form coil ends. The turn portions 40a and 400a which are formed such that the turn portions 400a of the large wire-strand group surround the turn portions 40b of the small wire-strand group 45 are arranged neatly in two rows circumferentially, to form coil-end portions 16a and 16b.

In this manner, according to Embodiment 5, the polyphase stator winding 16A is provided with a number of winding sub-portions, the first to fourth winding sub-portions 41 to 44, in each of which one strand of wire 40 or 400 is wound so as to alternately occupy an inner layer and an outer layer in a slot depth direction within every sixth slot 15a, the strands of wire folding back outside the slots at axial end surfaces of the stator core 15. First and second winding assemblies 45 each consisting of a pair of first and second winding groups are used, the first winding group being constituted by six first winding sub-portions 41 (or third winding sub-portions 43) disposed at a pitch of one slot from each other, and the second winding group being constituted by six second winding sub-portions 42 (or fourth winding sub-portions 44) disposed at a pitch of one slot from each other wound inversely so as to be offset at an electrical angle of 180° relative to the first winding sub-portions 41 (or third winding sub-portions 43). The second winding assembly is installed in the stator core 15 so as to envelop the first winding assembly 45.

Thus, by combining and installing the first and second winding assemblies into the stator core 15, six stator winding phase portions 162 are installed in the stator core 15, enabling assembly to be significantly improved.

Because winding connections between the first and second winding assemblies are formed by two adjacent-address crossover connections, and winding connections are formed by one same-address crossover connection within the second winding assembly, the crossover connection portions have an extremely simple construction. Thus, operations of pulling around and bending the strands of wire 40 and 400 to form the crossover connections can be significantly alleviated, greatly improving the connection operation.

Furthermore, because the crossover connection portions in each stator winding phase portion 162 are concentrated in two adjacent pairs of slots in which the slots in each pair are six slots apart, the connection operation is significantly improved.

Furthermore, according to Embodiment 5, because the turn portions 40a and 400a are stacked in two layers and arranged in rows circumferentially, coil-end height is raised by the width of one strand of wire, but the spacing between the turn portions 40a and 400a is increased in the circumferential direction, preventing short-circuiting accidents between the strands of wire.

Furthermore, increases, in the number of turns in the polyphase stator winding can be easily adapted for by winding wire-strand groups composed of continuous wire so as to stack up on top of each other in the height direction.

Embodiment 6

Figure 24:
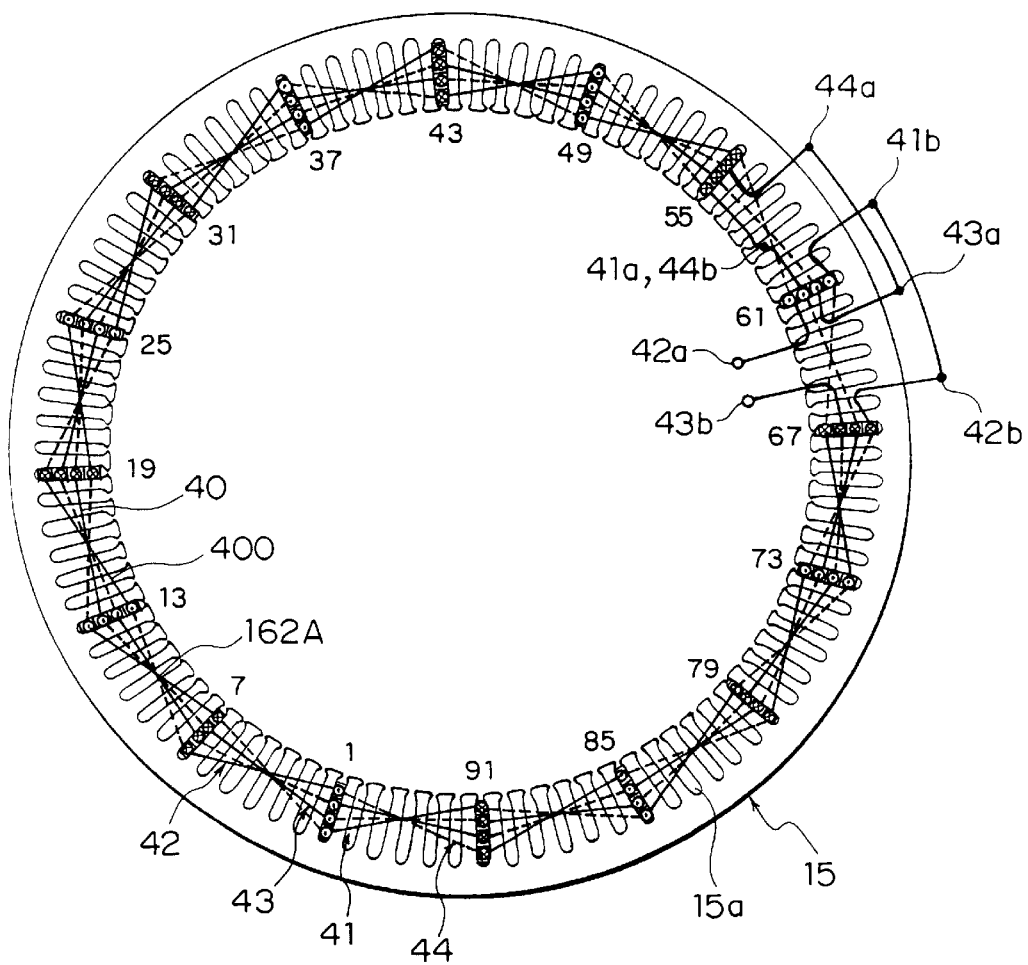
FIG. 24 is an end elevation explaining connections in one stator winding phase portion in an automotive alternator according to Embodiment 6 of the present invention.
Figure 25:
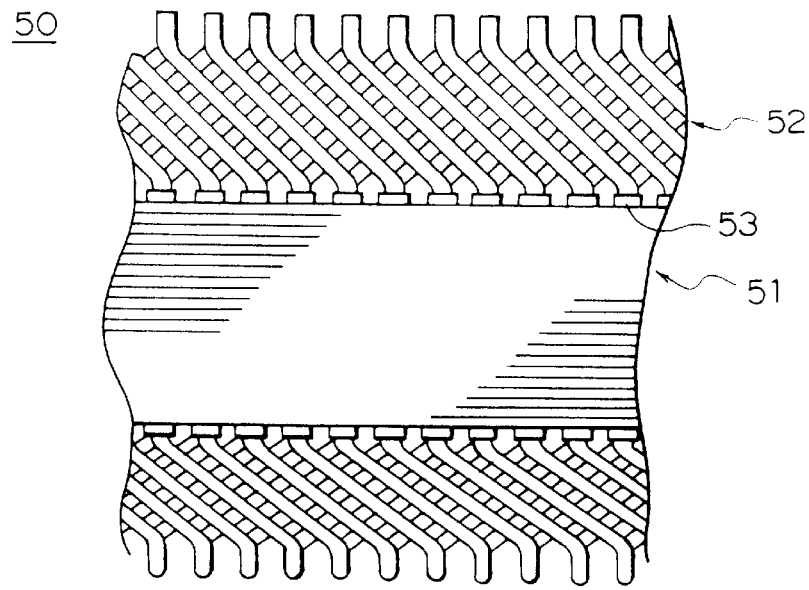
FIG. 25 is a side elevation showing part of a stator of a conventional automotive alternator.
Figure 26:
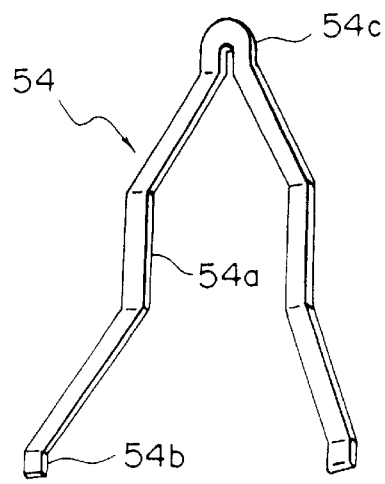
FIG. 26 is a perspective showing a conductor segment used in the stator of the conventional automotive alternator.
Figure 27:
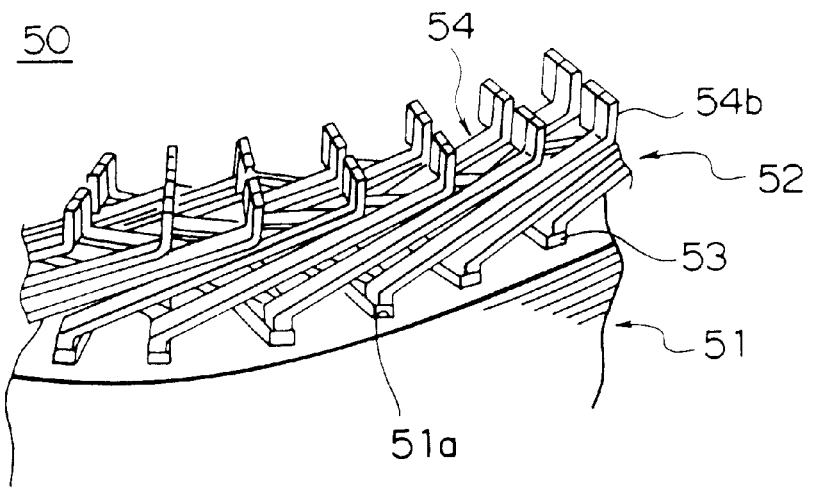
FIG. 27 is a perspective of part of the stator of the conventional automotive alternator from a front end.
Figure 28:
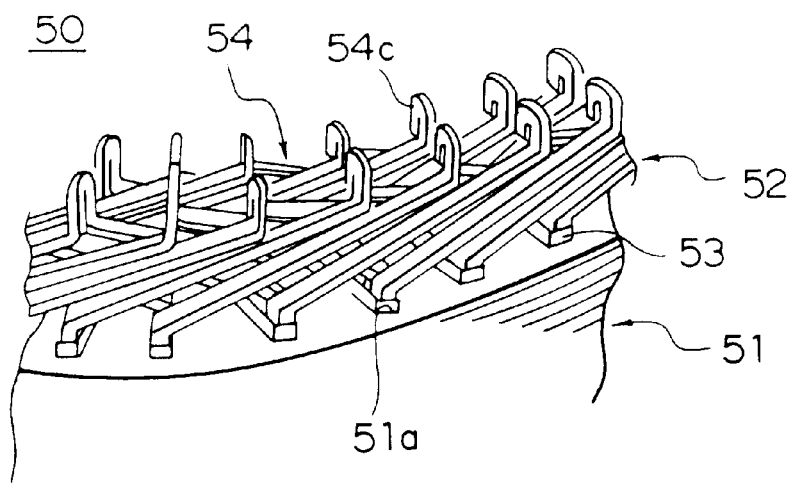
FIG. 28 is a perspective of part of the stator of the conventional automotive alternator from a rear end.

FIG. 24 is an end elevation explaining connections in one stator winding phase portion in an automotive alternator according to Embodiment 6 of the present invention.

In Embodiment 6, as in Embodiment 5, the second winding assembly is installed in the stator core 15 so as to envelop the first winding assembly 45.

At a first end of the stator core 15, a second end portion 42b of the second winding sub-portion 42 extending outwards from the first position from the outer circumferential side of slot number 67 and a second end portion 41b of the first winding sub-portion 41 extending outwards from the first position from the outer circumferential side of slot number 61 are crossover-connected (same-address crossover connection), then, a first end portion 43a of the third winding sub-portion 43 extending outwards from the second position from the outer circumferential side of slot number 61 and a first end portion 44a of the fourth winding sub-portion 44 extending outwards from the second position from the outer circumferential side of slot number 55 are crossover-connected (same-address crossover connection), and in addition, a second end portion 44b of the fourth winding sub-portion 44 extending outwards from the third position from the outer circumferential side of slot number 61 and a first end portion 41a of the first winding sub-portion 41 extending outwards from the fourth position from the outer circumferential side of slot number 55 are crossover-connected (adjacent-address crossover connection). Thus, the first to the fourth winding sub-portions 41 to 44 are connected in series to form a stator winding phase portion 162A having four turns.

At this time, the second end portion 43b of the third winding sub-portion 43 extending outwards from the third position from the outer circumferential side of slot number 67 and the first end portion 42a of the second winding sub-portion 42 extending outwards from the fourth position from the outer circumferential side of slot number 61 become an output wire (O) and a neutral point (N), respectively, of the stator winding phase portion 162A.

As explained above, each of the stator winding phase portions 162A according to Embodiment 6 of the present invention is constructed in the same way as in Embodiment 5 of the present invention except for the crossover connection method of the first to the fourth winding sub-portions 41 to 44.

More specifically, the winding sub-portions are connected by two same-address crossover connections within each of the winding assemblies, and the winding sub-portions are connected by one adjacent-address crossover connection between the first and second winding assemblies, to form each of the stator winding phase portions 162A which have four turns. Thus, the same effects as in Embodiment 5 can also be achieved in Embodiment 6.

Moreover, in each of the above embodiments, the fans 5 are disposed inside the case 3, but a fan may also be disposed outside the automotive alternator so as to rotate together with the rotation of the rotor.

Each of the above embodiments has been explained for six turns, four turns, and two turns, but when even lower-speed output is required eight turns may be used. Such cases can also be adapted to simply by inserting winding assemblies 29 into the stator core 15 so as to line up in four rows radially, or by inserting winding assemblies 45 into the stator core 15 so as to overlap fourfold. Naturally, odd numbers of turns may also be used.

Each of the above embodiments has been explained for use in an alternator with full-pitch windings, but the present constructions may also be used in an alternator with short-pitch windings (i.e., not full-pitch windings).

Each of the above embodiments can also be used in automotive alternators of the type in which the rotor coil is secured to a bracket and a rotating magnetic field is supplied across an air gap.

In each of the above embodiments, the number of slots in the stator was ninety-six slots for sixteen magnetic poles, but three phases and seventy-two slots for twelve magnetic poles, 120 slots for twenty poles, etc., may also be adopted. Furthermore, in the case of one slot per pole per phase, there may also be forty-eight slots for sixteen poles, thirty-six slots for twelve poles, sixty slots for twenty poles, etc.

In each of the above embodiments, the outer core of the stator core was constructed as a laminated body of SPCC material, but a pipe-shaped solid body outer core may also be used.

The slot opening portions may also be narrowed after insertion of the winding groups into the slots of the parallelepiped core by plastically deforming the tooth ends by pressing them with a jig in a radial direction.

Each of the above embodiments used a Lundell-type rotor having claw-shaped magnetic poles, but the same effects can be achieved using a salient-type rotor having projecting magnetic poles.

In each of the above embodiments, centrifugal fans were used for the fans 5, but the same effects can be achieved using axial flow fans or inclined flow fans which give rise to an axial component because even axial flow fans and inclined flow fans have a centrifugal component.

In each of the above embodiments, the rectifiers are disposed at the end of the rotor away from the pulley and the fan is disposed at the same end, but the fan may also be disposed at the end near the pulley when there is no particular problem with the temperature of the rectifiers. Because the height of the coil ends of the stator is low, wind resistance on the discharge side in the wind channel of the fan is significantly reduced, increasing the overall amount of ventilation. Consequently, suitable relative positions for the rectifiers, the pulley, and the fans may also be selected in consideration of the position where the alternator is mounted on the engine, of wind noise, as well as in consideration of magnetic noise, and of the temperature conditions of each portion.

In each of the above embodiments, the winding is formed with the strands of wire spaced, but because the strands of wire are coated with insulation, the winding may also be formed with the strands of wire completely in close proximity to each other. According to this construction, the density of the coil ends can be further increased, enabling the dimensions thereof to be further reduced. Furthermore, by reducing the gaps between the strands of wire irregularities are also reduced, enabling wind noise to be reduced further. Because the rigidity of the winding is also increased by contact between the strands of wire, short-circuiting between the strands of wire and between the strands of wire and the core due to vibration can be reduced and magnetic noise can also be reduced. Because heat transfer between the strands of wire is improved, the temperature of the strands of wire becomes more uniform, further reducing the temperature of the stator.

In each of the above embodiments, the insulators are inserted on the stator core side before the insertion of the wire-strand groups into the core, but the insulators may also first be wrapped around the portions of the strands of wire to be housed in the slots and inserted into the core together with the wire-strand groups. Furthermore, a long strip of insulators may be placed on top of the parallelepiped core and the wire-strand groups may be inserted form above such that the insulators are simultaneously inserted into and housed inside the slots together with the wire-strand groups. In that case, at a later stage, the protruding insulators may be removed together in one step. In addition, the portions of the strands of wire to be housed in the slots may be pre-molded with insulating resin. In that case, mass-producibility is significantly improved.

In each of the above embodiments, the annular core prepared by rolling up the parallelepiped core is inserted into the outer core, then the two cores are integrated by shrink fitting, but the annular core prepared by rolling up the parallelepiped core may be integrated with the outer core by press fitting the former into the latter.

In each of the above embodiments, the stator core was formed by inserting the annular core prepared by rolling up the parallelepiped core into the outer core and then shrink fitting the two cores, but an annular core having a thick core back may be prepared, in which case the outer core may be omitted. In the case where the stator core was formed by inserting the annular core into the outer core and then shrink fitting the two cores, a gap between the annular core and the outer core is made, causing output to deteriorate, and the rigidity of the stator core is reduced, causing magnetic noise to worsen. In the case where the stator core was formed with only the annular core having the thick core back, there is no abovementioned output deterioration due to the gap between the annular core and the outer core, and there is no rigidity deterioration in the stator core due to constituting the stator core with the annular core and the outer core, enabling increase in magnetic noise to be suppressed. Further, because the process for inserting the annular core into the outer core is omitted, the productivity of the stator is enhanced.

In each of the above embodiments, copper wire material having a rectangular cross section is used in the strand of wire, but the strand of wire are not limited to copper material having a rectangular cross section, and may, for example, be copper material having circular cross section. In that case, formability of the strands of wire is enhanced, facilitating easy placement and connection of the strands of wire, and improving the workability. Further, the strands of wire are not limited to copper material, and may, for example, be aluminium material.

The present invention is constructed in the above manner and exhibits the effects described below.

According to one aspect of the present invention, there is provided a stator for an alternator, including: a cylindrical stator core composed of a laminated core formed with a number of slots extending axially at a predetermined pitch in a circumferential direction; and a polyphase stator winding including a number of winding sub-portions in each of which a long strand of wire is wound so as to alternately occupy an inner layer and an outer layer in a slot depth direction within the slots at intervals of a predetermined number of slots, the strand of wire folding back outside the slots at axial end surfaces of the stator core, wherein the winding sub-portions are constituted by at least one winding assembly composed of a pair of first and second winding groups, the first winding group including a number of first winding sub-portions each having one turn constructed by winding one of the strands of wire so as to alternately occupy an inner layer and an outer layer in a slot depth direction within the slots at intervals of the predetermined number of slots, the first winding sub-portions being disposed at a pitch of one slot from each other and being equal in number to the predetermined number of slots, and the second winding group including a number of second winding sub-portions each having one turn constructed by winding one of the strands of wire so as to alternately occupy an inner layer and an outer layer in a slot depth direction within the slots at intervals of the predetermined number of slots and so as to be inversely wound and offset by an electrical angle of 180° relative to the first winding sub-portions, the second winding sub-portions being disposed at a pitch of one slot from each other and being equal in number to the predetermined number of slots, whereby the number of joints in the coil ends is significantly reduced, improving corrosion resistance and insulation, and a number of winding portions can be installed in the stator core simultaneously as winding assemblies, improving assembly and productivity.

Two winding assemblies may be installed in the stator core so as to be aligned in two rows in a radial direction, and each stator winding phase portion constituting the polyphase stator winding may be constituted by a winding portion having four turns in which the first and second winding sub-portions wound into the same slot group are connected in series, enabling a polyphase stator winding composed of stator winding portions in which each phase has four turns to be constructed easily.

Three winding assemblies may be installed in the stator core so as to be aligned in three rows in a radial direction, and each stator winding phase portion constituting the polyphase stator winding may be constituted by a winding portion having six turns in which the first and second winding sub-portions wound into the same slot group are connected in series, enabling a polyphase stator winding composed of stator winding portions in which each phase has six turns to be constructed easily.

Two winding assemblies may be installed in the stator core such that a first winding assembly envelops a second winding assembly, and each stator winding phase portion constituting the polyphase stator winding may be constituted by a winding portion having four turns in which the first and second winding sub-portions wound into the same slot group are connected in series, enabling a polyphase stator winding composed of stator winding portions in which each phase has four turns to be constructed easily.

Each phase constituting the polyphase stator winding may be constituted by a winding portion having four turns in which end portions of the first and second winding sub-portions between two of the winding assemblies are connected by two adjacent-address crossover connections, and end portions of the first and second winding sub-portions within one of the winding assemblies are connected by one same-address crossover connection, giving the crossover connection portions a simple construction and improving the connecting operation.

Each phase constituting the polyphase stator winding may be constituted by a winding portion having four turns in which end portions of the first and second winding sub-portions within each of the winding assemblies are connected by one same-address crossover connection per winding assembly, and end portions of the first and second winding sub-portions between two of the winding assemblies are connected by one adjacent-address crossover connection, giving the crossover connection portions a simple construction and improving the connecting operation.

The strands of wire may have a generally flattened cross-sectional shape, increasing the space factor of the strands of wire within the slots.

What is claimed is:

1. A stator for an alternator, comprising:
    a cylindrical stator core composed of a laminated core formed with a number of slots extending axially at a predetermined pitch in a circumferential direction; and
    a polyphase stator winding comprising a number of winding sub-portions in each of which a long strand of wire is wound so as to alternately occupy an inner layer and an outer layer in a slot depth direction within said slots at intervals of a predetermined number of slots, said strand of wire folding back outside said slots at axial end surfaces of said stator core,
    wherein said winding subportions are constituted by at least one winding assembly, said winding assembly comprising:
        a first winding group constructed by arranging the same number of first winding sub-portions as the number of said predetermined number of slots at one slot pitch from each other, each of said first winding sub-portions being constructed by forming one of said strands of wire into a pattern in which first straight portions are connected by first turn portions so as to be arranged at a pitch of said predetermined number of slots and adjacent first straight portions are offset by said first turn portions so as to alternately occupy said inner layer and said outer layer in said slot depth direction; and
        a second winding group constructed by arranging the same number of second winding sub-portions as the number of said predetermined number of slots at one slot pitch from each other, each of said second winding sub-portions being constructed by forming one of said strands of wire into a pattern in which second straight portions are connected by second turn portions so as to be arranged at a pitch of said predetermined number of slots and adjacent second straight portions are offset by said second turn portions so as to alternately occupy said inner layer and said outer layer in said slot depth direction;
        wherein said winding assembly is constructed by arranging said first and second winding sub-portions so as to overlap said first straight portions and said second straight portions each other so that said second winding sub-portions are inversely wound and offset by an electrical angle of 180° relative to said first winding sub-portions, each end portions of said strands of wire being extended on both sides of both ends of said winding assembly, and said winding assembly being constructed by arranging the same number of pairs of said overlapping first and second straight portions as the number of said slots at said one slot pitch.

2. The stator for an alternator according to claim 1 wherein:
    two of said winding assemblies are installed in said stator core so as to be aligned in two rows in a radial direction; and
    each stator winding phase portion constituting said polyphase stator winding is constituted by a winding portion having four turns in which said first and second winding sub-portions wound into the same slot group are connected in series.

3. The stator for an alternator according to claim 2 wherein each phase constituting said polyphase stator winding is constituted by a winding portion having four turns in which end portions of said first and second winding sub-portions between two of said winding assemblies are connected by two adjacent-address crossover connections, and end portions of said first and second winding sub-portions within one of said winding assemblies are connected by one same-address crossover connection.

4. The stator for an alternator according to claim 2 wherein each phase constituting said polyphase stator winding is constituted by a winding portion having four turns in which end portions of said first and second winding sub-portions within each of said winding assemblies are connected by one same-address crossover connection per winding assembly, and end portions of said first and second winding sub-portions between two of said winding assemblies are connected by one adjacent-address crossover connection.

5. The stator for an alternator according to claim 1 wherein:
    three of said winding assemblies are installed in said stator core so as to be aligned in three rows in a radial direction; and
    each stator winding phase portion constituting said polyphase stator winding is constituted by a winding portion having six turns in which said first and second winding sub-portions wound into the same slot group are connected in series.

6. The stator for an alternator according to claim 1 wherein:
    two of said winding assemblies are installed in said stator core such that a first winding assembly envelops a second winding assembly; and
    each stator winding phase portion constituting said polyphase stator winding is constituted by a winding portion having four turns in which said first and second winding sub-portions wound into the same slot group are connected in series.

7. The stator for an alternator according to claim 6 wherein each phase constituting said polyphase stator winding is constituted by a winding portion having four turns in which end portions of said first and second winding sub-portions between two of said winding assemblies are connected by two adjacent-address crossover connections, and end portions of said first and second winding sub-portions within one of said winding assemblies are connected by one same-address crossover connection.

8. The stator for an alternator according to claim 6 wherein each phase constituting said polyphase stator winding is constituted by a winding portion having four turns in which end portions of said first and second winding sub-portions within each of said winding assemblies are connected by one same-address crossover connection per winding assembly, and end portions of said first and second winding sub-portions between two of said winding assemblies are connected by one adjacent-address crossover connection.

9. The stator for an alternator according to claim 1 wherein said strands of wire have a generally flattened cross-sectional shape.

* * * * *